US011238435B2

(12) United States Patent
Lu et al.

(10) Patent No.: US 11,238,435 B2
(45) Date of Patent: Feb. 1, 2022

(54) METHOD FOR QUERYING INFORMATION IN VISUAL SMART CARD AND VISUAL SMART CARD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 372 days.

(21) Appl. No.: 16/332,428

(22) PCT Filed: Nov. 13, 2017

(86) PCT No.: PCT/CN2017/110630
§ 371 (c)(1),
(2) Date: Mar. 12, 2019

(87) PCT Pub. No.: WO2018/113449
PCT Pub. Date: Jun. 28, 2018

(65) Prior Publication Data
US 2021/0295309 A1    Sep. 23, 2021

(30) Foreign Application Priority Data
Dec. 19, 2016    (CN) .......................... 201611180589.3

(51) Int. Cl.
*G06Q 20/34* (2012.01)
*G06K 19/077* (2006.01)
(Continued)

(52) U.S. Cl.
CPC ..... *G06Q 20/341* (2013.01); *G06K 19/07707* (2013.01); *G06K 19/07747* (2013.01);
(Continued)

(58) Field of Classification Search
CPC ............. G06Q 20/341; G06Q 20/3676; G06Q 20/389; G06Q 20/4012; G06K 19/07707; G06K 19/07747
See application file for complete search history.

(56) References Cited

U.S. PATENT DOCUMENTS

2009/0314840 A1* 12/2009 Granucci ......... G06K 19/07703
235/492
2016/0307190 A1* 10/2016 Zarakas ............. G06Q 20/3829

FOREIGN PATENT DOCUMENTS

EP           2256645 A1    12/2010

* cited by examiner

*Primary Examiner* — Kristy A Haupt
(74) *Attorney, Agent, or Firm* — Hammer & Associates, P.C.

(57) ABSTRACT

A method for querying information in a visual smart card, comprising: a micro control unit receiving, by means of an input device, a query request inputted by a user (S1); the micro control unit determining information queried by a user request according to a received query request (S2); if first information, the micro control unit reading a first information record which is stored thereby, and parsing the first information record to obtain the first information, the first information being displayed by means of a display device (S3); if second information, the micro control unit sending an application selection instruction to a smart card chip, receiving an application selection response returned by the smart card chip, then sending an information record reading instruction to the smart card chip, receiving a second information record returned by the smart card chip, and parsing the second information record to obtain the second information, the second information being displayed by means of the display device (S4). A visual smart card applicable to said method overcomes the shortcomings in the existing technology wherein the assistance of other devices is
(Continued)

required, while carrying out querying by means of operating a smart card directly facilitates a holder of a smart card understanding information in the smart card, improving the ease of use of smart cards.

20 Claims, 4 Drawing Sheets

(51) Int. Cl.
*G06Q 20/38* (2012.01)
*G06Q 20/36* (2012.01)
*G06Q 20/40* (2012.01)
(52) U.S. Cl.
CPC ....... *G06Q 20/3676* (2013.01); *G06Q 20/389* (2013.01); *G06Q 20/4012* (2013.01)

METHOD FOR QUERYING INFORMATION IN VISUAL SMART CARD AND VISUAL SMART CARD

TECHNICAL FIELD

The present invention relates to a method for inquiring information in a visual smart card and a visual smart card thereof, which belongs to the field of smart card.

PRIOR ART

A smart card is the most popular card in the market at the present because of its safe and convenient characters. In prior art, it is difficult for a card holder to inquire information, such as trading record and trading result, in a smart card, the card holder needs to inquire the information via equipment with function of reading card, such as terminal devices of banks or merchant.

SUMMARY OF THE INVENTION

The object of the present invention is to provide a method for inquiring information in the visual smart card and the smart card thereof, a card holder can inquire the information in the visual card without an equipment with the function of reading card, in this way, a card holder can inquire information in the card more easily, and the card is more usable.

Thus, according to the first aspect of the present invention, it provides a method for inquiring information in a visual smart card, which applies to a visual smart card including an input device, a display device, a microcontroller unit, a smart card chip and a self-powered device, the method includes following steps:

Step S1, receiving, by the microcontroller unit, an inquiring request input by a user via the input device, executing Step S2 in the case that the inquiring request is received;

Step S2, determining, by the microcontroller unit, information which the user requests to inquire according to the inquiring request, executing Step S3 in the case that the information which the user requests to inquire is a first information; executing Step S4 in the case that the information which the user requests to inquire is a second information;

Step S3, reading, by the microcontroller unit, a first information record saved in the microcontroller unit, parsing the first information record to obtain the first information, and displaying the first information via the display device; and Step S4, sending, by the microcontroller unit, an instruction for selecting applet to the smart card chip, receiving a response to the instruction for selecting applet returned by the smart card chip, and sending a reading-information-record instruction to the smart card chip, and receiving a second information record returned by the smart card chip, and parsing the second information record to obtain the second information, and displaying the second information via the display device.

In the above method, after Step S3 and Step S4 can further includes: the microcontroller unit trying to receive a returning request from the user via the input device, returning to Step S1 in the case that the returning request is received from the user; the visual smart card powering off in the case that the returning request is not received in a preset duration.

Before Step S1, the above method further includes the visual smart card powering on; after the visual smart card powering on, the method further includes: the microcontroller unit receiving a powering off request by the user via the input device, the visual smart card powering off in the case that the powering off request is received.

According to the other aspect of the present invention, it provides a visual smart card which includes an input device, a display device, a microcontroller unit, a smart card chip and a self-powered device, in which, the microcontroller unit specifically includes:

a receiving module which is configured to receive an inquiring request input by a user via the input device;

a determining module which is configured to determine the information which the user request to inquire according to the inquiring request received by the receiving module;

a storing module which is configured to store a first information record;

a first reading and parsing module which is configured to read the first information record stored in the storing module and parse the first information record to obtain the first information in the case that the determining module determines that the information which the user request to inquire is the first information;

a second reading and parsing module which is configured to send the instruction for selecting applet to the smart card chip, receive the response to the instruction for selecting applet returned from the smart card chip, and send instruction for reading information to the smart card chip, and receive the second information record from the smart card chip, and parse the second information record to obtain the second information in the case that the determining module determines the information which the user request to require is the second information; and a displaying module which is configured to display the first information obtained by the first reading and parsing module and the second information obtained by the second reading and parsing module via the display device.

The receiving module is further configured to receive a returning request input by the user via the input device when the displaying module displays the first information and the second information, and make the visual smart card power off in the case the returning request is not received within a preset duration.

The receiving module is further configured to receive a close down request input by the user via the input device after the visual smart card is powered on; correspondingly, the microcontroller unit further includes: a powering on and powering down module which is configured to power on the visual smart card, and power down the visual smart card in the case that the close down request is received by the receiving module.

The advantage of the present invention is that it can inquire information in a card without other devices, in this way, a user can inquire anytime the information in the card, it is more convenient for users.

DETAILED DESCRIPTION OF EMBODIMENTS

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
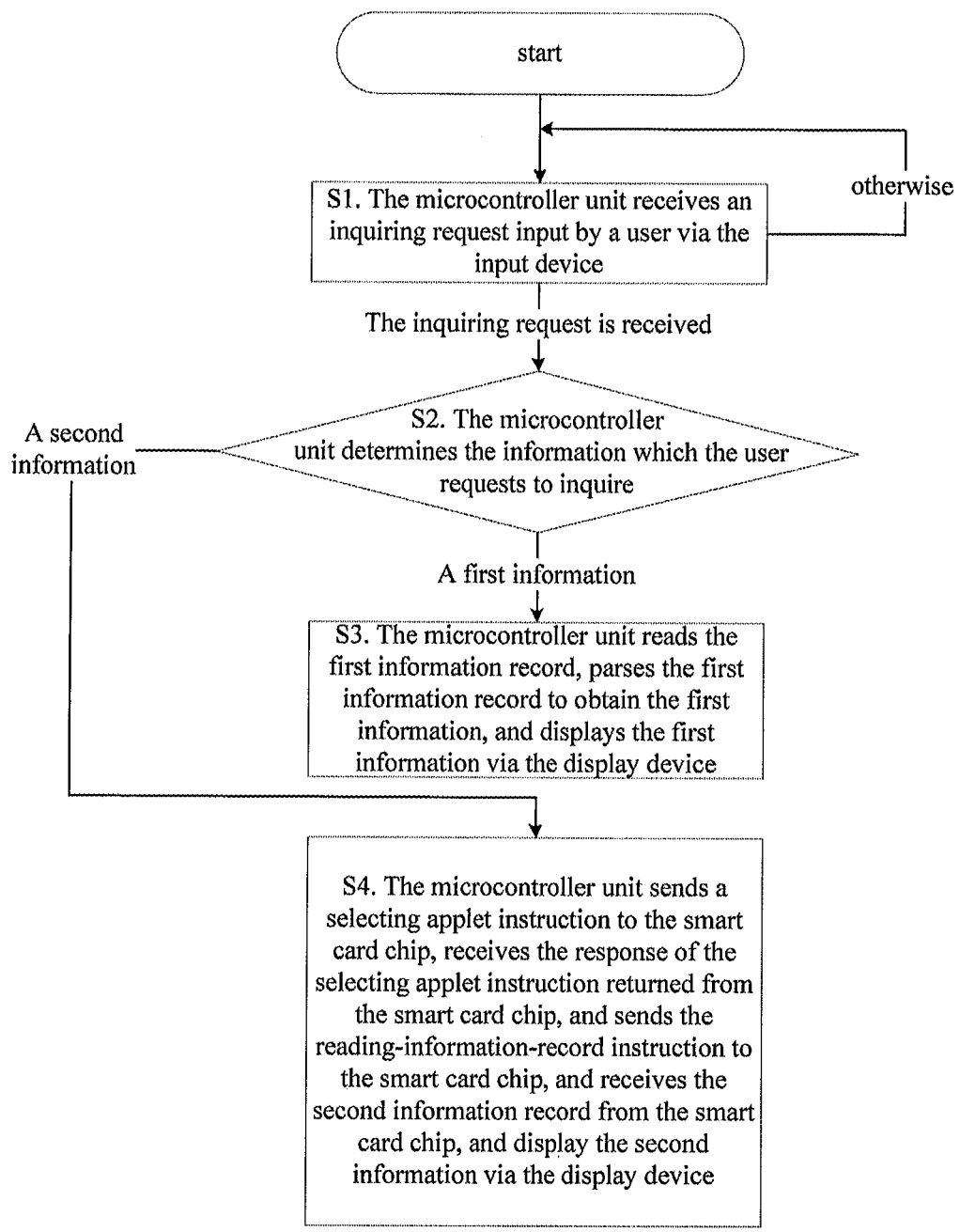
FIG. 1 provides a flow chart of a method for inquiring information in a visual smart card according to Embodiment 1 of the present invention.

As shown in FIG. 1, it provides a method for inquiring information in a visual smart card, which applies to the visual smart card which includes an input device, a display device, a microcontroller unit, a smart card chip and a self-powered device, specifically comprises:

Step S1, the microcontroller unit tries to receive an inquiring request input by a user via the input device, goes to Step S2 in the case that the inquiring request is received; keeps receiving in the case that the inquiring request is not received.

Step S2, the microcontroller unit determines information that the user requests to inquire according to the inquiring request, goes to Step S3 in the case that the information is a first information; goes to Step S4 in the case that the information is a second information.

In Embodiment 1, preferably, the microcontroller unit receives the inquiring request from the user via a query key of the input device, the microcontroller unit determines that the inquiring request is received from the user when the microcontroller unit detects that the query key is pressed down; and the microcontroller unit further determines the information which the user request to inquire according to the query key pressed down.

Step S3, the microcontroller unit reads a first information record stored in the microcontroller unit, parses the first information record to obtain the first information, and displays the first information via the display device.

Step S4, the microcontroller unit sends an instruction for selecting applet to the smart card chip, receives a response to the instruction for selecting applet from the smart card chip, and sends a reading-information-record instruction to the smart card chip, and receives the second information record from the smart card chip, and parses the second information record to obtain the second information and displays the second information via the display device.

In Embodiment 1, the first information specifically is a transaction record of the last time, correspondingly, Step S3 specifically includes that the microcontroller unit reads a transaction log stored in the microcontroller unit to obtain the last record information from the transaction logs, and parses the transaction record information obtained to obtain the transaction record of the last time, and displays the transaction record of the last time via the display device.

In Embodiment 1, the first information can specifically be the transaction record, correspondingly, Step S3 specifically includes:

Step S3-1, the microcontroller unit reads the transaction logs stored in the microcontroller unit to obtain the last record information from the transaction logs;

Step S3-2, the microcontroller makes the record information obtained as the current record information, parses the current record information to obtain the current transaction record, and displays the current transaction record via the display device;

Step S3-3, the microcontroller unit receives a page turning request input by the user via the input device; in the case that the page turning request is a page up request, tries to obtain the record information before the current record information from the transaction logs, returns to Step S3-2 if the record information before the current record information is obtained; displays corresponding information via the display device if the record information before the current record information is not obtained;

in the case that the page turning request is a page down request, tries to obtain the record information after the current record information from the transaction logs, return to Step S3-2 if the record information after the current record information is obtained; displays corresponding information via the display device if the record information after the current record information is not obtained.

Preferably, the microcontroller unit receives the page up request specifically via a page up key of the input device, and receives the page down request specifically via a page down key of the input device.

Furthermore, in Embodiment 1, the transaction record specifically is a transaction result or a transaction detail.

In Embodiment 1, after Step S3 or Step S4, the method can further include that the microcontroller unit tries to receive a returning request input by the user via the input device, returns to Step S1 if the returning request is received; the visual smart card is powered off if the returning request is not received within the preset duration; preferably, the microcontroller unit receives the returning request input by the user via a returning key of the input device, the returning request input by the user is received when the microcontroller unit detects that the returning key is pressed down.

In Embodiment 1, the second information specifically is a balance of electronic cash, correspondingly, Step S4 specifically includes:

Step 1-1, the microcontroller unit sends the instruction for selecting applet to the smart card chip, and receives the response to the instruction for selecting applet from the smart card chip;

Step 1-2, the microcontroller unit sends an instruction for reading balance of electronic cash to the smart card chip, and receives information of balance of electronic cash returned from the smart card chip;

Step 1-3, the microcontroller unit parses the information of balance of electronic cash to obtain a balance of electronic cash, and displays the balance of electronic cash via the display device.

In Embodiment 1, the second information can specifically be a transaction record of electronic cash, correspondingly, Step S4 specifically includes:

Step 2-1, the microcontroller unit sends the instruction for selecting applet to the smart card chip, and receives a response to the instruction for selecting applet returned from the smart card chip;

Step 2-2, the microcontroller unit obtains transaction record file information according to the response to the instruction for selecting applet, and organizes an instruction for reading transaction record of electronic cash;

Step 2-3, the microcontroller unit sends the instruction for reading transaction record of electronic cash to the smart card chip, receives the information of transaction record of electronic cash returned from the smart card chip;

Step 2-4, the microcontroller unit parses the received information of transaction record of electronic cash to obtain the transaction record of electronic cash, and displays the transaction record of electronic cash via the display device.

Furthermore, before Step 2-4, the method includes: the microcontroller unit sends instruction for obtaining transaction record format to the smart card chip, receives information of transaction record format returned from the smart card chip, and parses the information of transaction record format to obtain transaction record format;

Correspondingly, parsing the received information of transaction record of electronic cash specifically includes: the received information of transaction record of electronic cash is parsed according to the transaction record format.

In Embodiment 1, the second information can specifically be member-points-information, correspondingly, Step S4 specifically includes:

Step 3-1, the microcontroller unit sends the instruction for selecting applet to the smart card chip, receives the response to the instruction for selecting applet returned from the smart card chip;

Step 3-2, the microcontroller unit sends instruction for reading member-points-information to the smart card chip, and receives the member-points-information returned from the smart card chip;

Step 3-3, the microcontroller unit parses the member-points-information, and displays the member-points-information via the display device according to a parsed result.

In Embodiment 1, the second information can specifically be number of retries of offline pin code, correspondingly, Step S4 specifically includes:

Step 4-1, the microcontroller unit sends the instruction for selecting applet to the smart card chip, and receives the response to the instruction for selecting applet returned from the smart card chip;

Step 4-2, the microcontroller unit sends instruction for reading the number of retries of offline pin code to the smart card chip, and receives the information of number of retries of offline pin code returned from the smart card chip;

Step 4-3, the microcontroller unit parses the information of number of retries of offline pin code to obtain the number of retries of offline pin code, and displays the number of retries of offline pin code via the display device.

In Embodiment 1, the second information can specifically be a balance of e-wallet, correspondingly, Step S4 specifically includes:

Step 5-1, the microcontroller unit sends the instruction for selecting applet to the smart card chip, and receives the response to the instruction for selecting applet returned from the smart card chip;

Step 5-2, the microcontroller unit sends an instruction for reading the balance of e-wallet to the smart card chip, and receives information of the balance of e-wallet from the smart card chip;

Step 5-3, the microcontroller unit parses the information of the balance of e-wallet to obtain the balance of e-wallet, and displays the balance of e-wallet via the display device.

In Embodiment 1, the second information can specifically be supplementary information, correspondingly, Step S4 specifically includes:

Step 6-1, the microcontroller unit sends the instruction for selecting applet to the smart card chip, and receives the response to the instruction for selecting applet returned from the smart card chip;

Step 6-2, the microcontroller unit obtains record file information of the supplementary information according to the response to the instruction for selecting applet, and organizes an instruction for reading supplementary information record according to the record file information of the supplementary information;

Step 6-3, the microcontroller unit sends the instruction for reading supplementary information record to the smart card chip, and receives the supplementary information record returned from the smart card chip;

Step 6-4, the microcontroller unit parses the supplementary information record to obtain the supplementary information, and displays the supplementary information via the display device.

Furthermore, before the supplementary information is displayed via the display device, the method further includes: the microcontroller unit correspondingly generates searchable supplementary information item according to the supplementary information, and displays the searchable supplementary information item via the display device, and receives choice for the supplementary information item from the user; correspondingly, the supplementary information displayed via the display device specifically is the supplementary information corresponding to the item chosen by the user.

The supplementary information in the Embodiment 1 can include coupon information and/or discount coupon information and/or customer manager information.

In Embodiment 1, before Step S1, the method further includes: the visual smart card powers on; after the visual smart card powers on, the method further includes: the microcontroller unit receives a power off request input by the user via the input device, the visual smart card powers off when the power off request is received; preferably, the microcontroller unit receives the power off request input by the user via a power key in the input device, the microcontroller unit receives the power off request input by the user when it detects the power key is pressed down.

Embodiment 2

Figure 2:
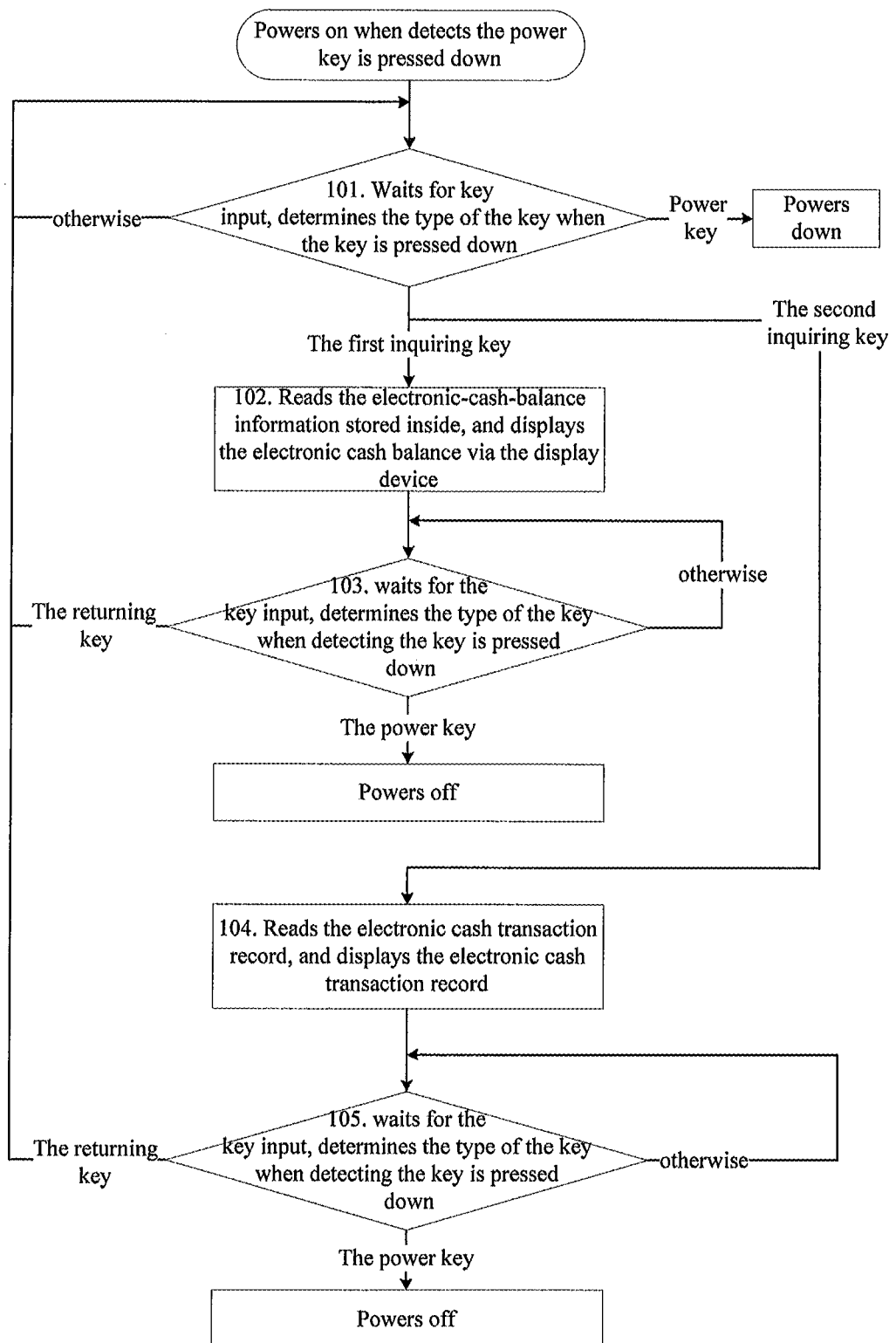
FIG. 2 provides a flow chart of a method for inquiring information in a visual smart card according to Embodiment 2 of the present invention.

According to the Embodiment 2, it provides a method for inquiring information in a visual smart card, which applies to a visual smart card with a self-powered device, an input device and a display device, and the input device includes a number of buttons. As shown in FIG. 2, the visual smart card executes following steps when it detects the power key is pressed down:

Step 101, waits for the key being pressed down, determines which type the key is when the key is detected being pressed down, powers off in the case that the key pressed down is a power key; goes to Step 102 in the case that the key is a first inquiring key; goes to Step 104 in the case that the key is a second inquiring key; otherwise, keeps waiting.

Furthermore, in Embodiment 2, after the visual smart card powers on, the method further includes: displays corresponding information, and prompts the user to press a key;

Step 101 can further include: the smart key powers off in the case that no key is pressed down in a preset duration; for instance, the preset duration is 30 seconds.

Step 102, reads balance information of electronic cash stored inside the card, and displays the balance of electronic cash via the display device; For instance, the balance information of the electronic cash stored inside the smart card is 0x00 0x00 0x00 0x05 0x68 0x00, the smart card displays 568.00 via the display device.

Step 103, waits for the key being pressed down, determines which type the key is when the smart card detects a key is pressed down, the smart card powers off if the key is the power key, returns to Step 101 when the key is a return key; otherwise, keeps waiting for a key being pressed down.

Furthermore, in Embodiment 2, Step 103 can further include that the smart card powers off in the case that no key is detected to be pressed down in a preset duration; for instance, the preset duration is 30 seconds.

Step 104, reads a transaction record of electronic cash stored inside, and displays the transaction record of electronic cash via the display device;

Furthermore, in Embodiment 2, a transaction date, a transaction time and a transaction amount of each transaction of electronic cash are recorded in the transaction record of electronic cash;

Step 104 can specifically include:

Step 1-1, reads the transaction record of electronic cash stored inside;

Step 1-2, displays the latest transaction record via the display device;

In Embodiment 2, according to Step 101, the user starts to inquiry the transaction record of electronic cash by pressing down a second inquiry key, the latest transaction record mentioned in Step 1-2 is a transaction record, of which the transaction date and the transaction time are closest to the time when the inquiry is started;

Preferably, in Embodiment 2, the visual smart card stores the transaction records of electronic cash according to the sequence of transactions of electronic cash, which means that the transaction happened first is stored first, the transaction happened later is stored behind, in Step 1-2, the visual smart card displays the latest transaction record of electronic cash according to the last piece of record in the transaction record of electronic cash;

For instance, the last piece of record is 0x16 0x05 0x23 0x17 0x43 0x58 0x00 0x00 0x00 0x00 0x02 0x00 0x00 0x00 0x00 0x00 0x0d 0x00 0x08 0x40 0x08 0x40 0x00 0x00 0x00 0x00 0x00 0x00 0x00 0x00 0x00 0x00 0x00 0x00 0x00 0x00 0x00 0x00 0x00 0x00 0x00 0x00 0x0f 0x00 0x51, the smart card displays 20160523 17-43-58 2.00 via the display device;

Shown as above, the visual smart card displays information including the transaction date, the transaction time and the transaction amount via the display device, in the case that the display screen cannot display all of the contents, each piece of information can be displayed one by one, and can be switched by pressing a page up/down key.

Step 1-3, waits for a key being pressed down, determines which type the key is when the smart card detects a key is pressed down, the smart card powers off in the case that the key is the power key; returns to Step 101 if the key is the return key; goes to Step 1-4 if the key is a page-up key; goes to Step 1-6 if the key is a page-down key; otherwise, keeps waiting for the key being pressed down;

Furthermore, Step 1-3 can further include that the smart card powers off if no key is pressed down in the preset duration; for instance, the preset duration is 30 seconds.

Step 1-4, determines whether there is a previous transaction record, if yes, goes to Step 1-5; otherwise, returns to Step 1-3;

Step 1-5, displays the previous transaction record via the display device, returns to Step 1-3;

Step 1-6, determines whether there is a next transaction record, if yes, goes to Step 1-7; otherwise, returns to Step 1-3;

Step 1-7, displays the next transaction record via the display device, and returns to Step 1-3.

Step 105, waits for a key being pressed down, determines which type is the key when the smart card detects a key is pressed down, the smart card powers off if the key is the power key; returns to Step 101 if the key is the return key; otherwise, keeps waiting for a key being pressed down.

Furthermore, in Embodiment 2, Step 105 further includes: the smart card powers off if the time for waiting for a key being pressed down is longer than the preset duration; for instance, the preset duration is 30 seconds, the visual smart card will power off if it does not detect a key is pressed down within the 30 seconds.

In Embodiment 2, the power key, the return key, the first inquiry key and the second inquiry key are function keys, the relation between each function key and the buttons of the input device of the visual smart card is one-to-one, one-to-many or many-to-one, etc. In Embodiment 2, the realization of each function key will not be limited.

Embodiment 3

Figure 3:
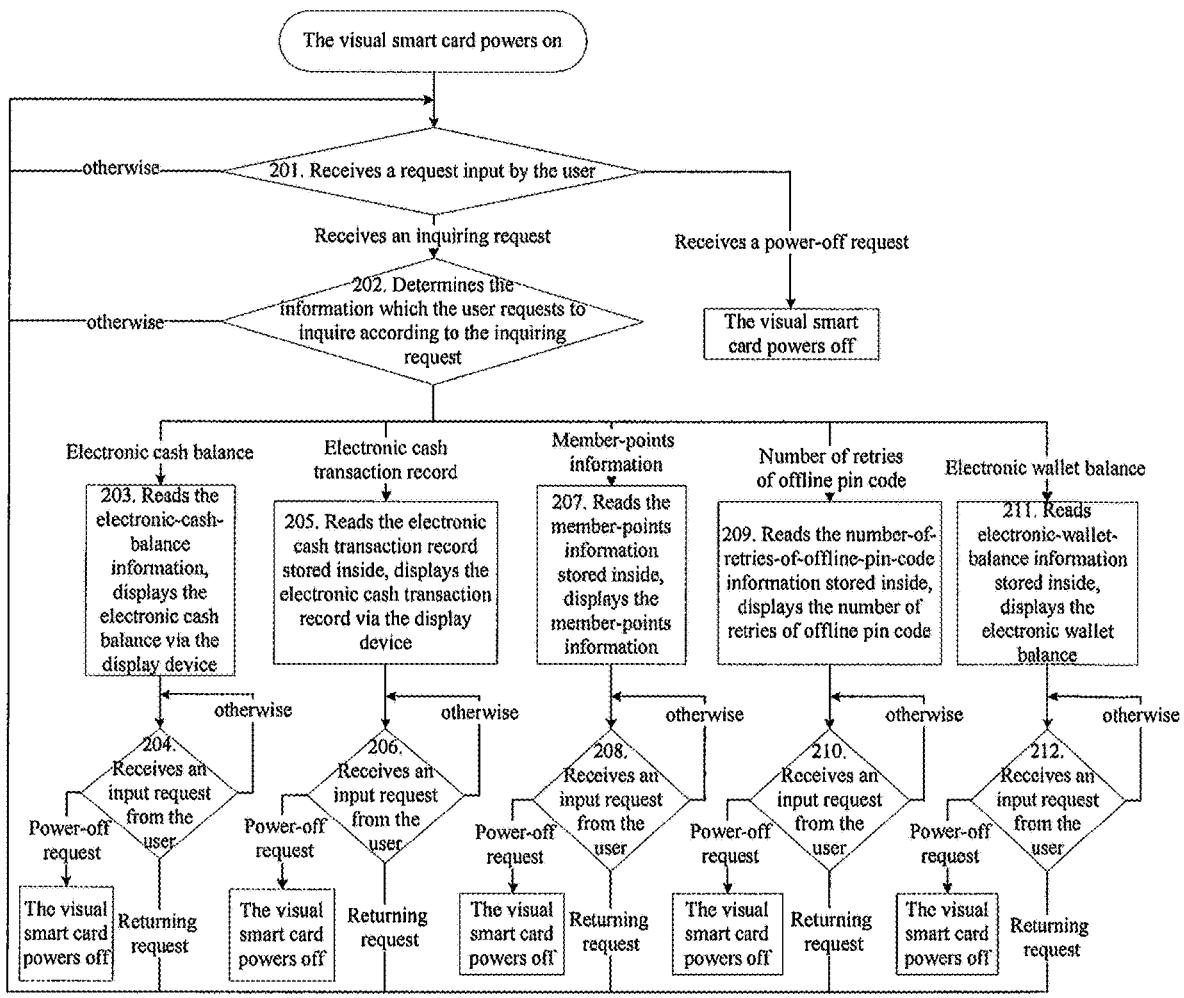
FIG. 3 provides a flow chart of the method for inquiring information in a visual smart card according to Embodiment 3 of the present invention.

According to Embodiment 3, it provides a more specific embodiment which bases on the above embodiments, in Embodiment 3, there can be multiple of applets which support information inquiry inside the visual smart card. As shown in FIG. 3, it provides a method for inquiring information inside a visual smart card, including following steps after the visual smart card powers on:

Step 201, receives a request input by a user, the visual smart card powers off if the request is a power off request; goes to Step 202 if the request is an inquiring request; otherwise, goes on trying to receive.

Step 202, determines information which a user requests to inquire according to the inquiring request, goes to Step 203 if the information is a balance of electronic cash; goes to Step 205 if the information is a transaction record of electronic cash; goes to Step 207 if the information is a member-points-information; goes to Step 209 if the information is a time of retries of offline pin code; goes to Step 211 if the information is a balance of e-wallet; goes to Step 201 if the information is not one of the above information.

In Embodiment 3, in Step 202, when determining the information that the user requests to inquire according to the received inquiring request, the method can further include: goes to Step 213 and Step 214 in the case that the information which the user requests to inquire is the previous transaction record;

Or, in Embodiment 3, in Step 202, when determining the information which the user requests to inquire according to the received inquiring request, the method can further include: goes to Step 215' and Step 216 in the case that the information which the user requests to inquire is the transaction record.

In Embodiment 3, in Step 202, when determining the information which the user requests to inquire according to the received inquiring request, the method can further include: goes to Step 217 and Step 218 in the case that the information which the user requests to inquire is the supplementary information.

The said visual smart card in Embodiment 3 includes an input device, a display device, a microcontroller unit (MCU), a smart card chip and a self-powered device.

Step 201 specifically includes: MCU receives a request input by the user via the key of the input device, the request input by the user is a power-off request if the smart card detects that the power key is pressed down; the request input by the user is an inquiring request if the smart card detects that the inquiring key is pressed down; preferably, Step 201 can further include: the visual smart card powers off if the smart card detects that no key is pressed down in a preset duration; for instance, the preset duration is 30 seconds.

Furthermore, MCU determines the information which the user requests to inquire according to the inquiring key which is pressed down, the information which the user requests to inquire is the balance of electronic cash if the inquiring key pressed down is a first inquiring key; the information which the user requests to inquire is the transaction record if the inquiring key pressed down is a second inquiring key; the information which the user requests to inquire is the member-points-information if the inquiring key pressed down is a third inquiring key; the information which the user requests to inquire is the number of retries of offline pin code if the inquiring key pressed down is a fourth inquiring key; the information which the user requests to inquire is the balance of e-wallet if the inquiring key pressed down is a fifth inquiring key; the information which the user requests to inquire is the previous transaction record/transaction record if the inquiring key pressed down is a sixth inquiring key; the information which the user requests to inquire is the supplementary information if the inquiring key pressed down is a seventh inquiring key.

Step 203, reads the balance information of electronic cash stored inside, and displays the balance of electronic cash via the display device.

Furthermore, in the case that there are multiple of applets which support inquiring the balance of electronic cash inside the visual smart card, when the information which the user requests to inquire is determined to be the balance of electronic cash, Step 203 further includes that selects target applet; correspondingly, Step 203 is replaced by Step 203' which includes that reads the balance information of electronic cash of the target applet which is stored in the card, and displays the balance of electronic cash of the target applet via the display device.

For instance, if the balance information of electronic cash which is read is 0x00 0x00 0x00 0x05 0x68 0x00, the smart card displays 568.00 via the display device.

Step 204, receives a request input by the user, returns to Step 201 in the case that the request is a returning request; the visual smart card powers off in the case that the request is a power-off request; keeps receiving in the case that the request is neither the returning request nor the power-off request.

In Embodiment 3, Step 204 specifically includes: MCU receives the request input by the user via keys of the input device, it is determined that the request input by the user is the power-off request in the case that power key is detected pressed down; it is determined that the returning request input by the user is received in the case that the returning key is detected pressed down; preferably, Step 204 can also include: the visual smart card powers off if MCU does not detect that any key is pressed down in the preset duration; for instance, the preset duration is 30 seconds.

Step 205, reads the transaction record of electronic cash stored inside, and displays the transaction record of electronic cash via the display device.

Furthermore, in the case that there are multiple of applets which support the transaction record inquiry of electronic cash inside the visual smart card, when the information which the user requests to inquire is determined to be the transaction record of electronic cash, Step 205 further includes: selects target applet; correspondingly, Step 205 is replaced by Step 205', which includes: reads the transaction record of electronic cash of the target applet stored inside, and displays the transaction record of electronic cash of the target applet via the display device.

Step 206, receives a request input by the user, returns to Step 201 if the returning request is received; the visual smart card powers off if the power-off request is received; keeps receiving request if no request is received.

In Embodiment 3, Step 206 specifically includes: MCU receives the request input by the user via keys of the input device, it is determined that the request input by the user is the power-off request in the case that power key is detected pressed down; it is determined that the returning request input by the user is received in the case that the returning key is detected pressed down; preferably, Step 206 can also include: the visual smart card powers off if MCU does not detect that any key is pressed down in the preset duration; for instance, the preset duration is 30 seconds.

Furthermore, in Step 205, displaying the transaction record of electronic cash via the display device specifically includes: Step 205-1, makes one piece of transaction record from the transaction records of electronic cash as a current transaction record, and displays the current transaction record; for instance, if the current transaction record is 0x16 0x05 0x23 0x17 0x43 0x58 0x00 0x00 0x00 0x00 0x02 0x00 0x00 0x00 0x00 0x00 0x0d 0x00 0x08 0x40 0x08 0x40 0x00 0x00 0x00 0x00 0x00 0x00 0x00 0x00 0x00 0x00 0x00 0x00 0x00 0x00 0x00 0x00 0x00 0x00 0x00 0x00 0x0f 0x00 0x51, the smart card displays 20160523 17-43-58 2.00 via the display device;

Correspondingly, Step 206 is replaced by the step which includes: receives a request input by the user, returns to Step 201 if the returning request is received; goes to Step 206' if the page-turning request is received; the visual smart card powers off if the power-off request is received; the visual smart card powers off if there is no request input by the user is received in the preset duration;

Step 206' specifically includes: makes the corresponding transaction record from the read transaction records of electronic cash as the current transaction record, and displays the current transaction record, and returns to Step 205-1;

Specifically, in Embodiment 3, MCU receives the page-turning request and the power-off request via the keys of the input device, the page-turning request is received when MCU detects that the page-turning key of the input device is pressed;

For instance, the page turning keys include the page-up key and the page-down key, the read transaction record of electronic cash in Step 205 includes four transaction records, the display device displays the third piece of transaction of the read transaction record of electronic cash in the case that the returning request input by the user is received in Step 206; determines the type of the key, updates displaying content to the second piece of transaction record of the read transaction records of electronic cash in the case that the key is the page-up key; updates the displaying content to the fourth piece of transaction record of the read transaction records of electronic cash in the case that the key is the page-down key.

Step 207, reads the member-points-information stored inside, and displays the member-points-information via the display device.

Furthermore, in the case that there are multiple of applets supporting inquiring the points, when the information which the user requests to inquire is the member-points-information, Step 207 further includes: selects the target applet; correspondingly, Step 207 is replaced by Step 207' which includes: reads the member-points-information of the target applet stored inside, and displays the member-points-information of the target applet via the display device.

For instance, if the read member-points-information is 0x9F 0x79 0x06 0x00 0x00 0x00 0x00 0x10 0x00, the smart card displays 1000 via the display device.

Step 208, receives a request input by the user, returns to Step 201 if the returning request is received; the visual smart card powers off if the power-off request is received; otherwise, keeps receiving the request.

In Embodiment 3, Step 208 specifically includes: MCU receives the request input by the user via the keys of the input device, it is determined that the power-off request input by the user is received when the MCU detects the power key is pressed down; it is determined that the returning request is received when the returning key is detected pressed down; preferably, can also include: the visual smart card powers off if no key is pressed down in the preset duration; for instance, the preset duration is 30 seconds.

Step 209, reads the information of the number of retries of offline pin code, and displays the number of retries of offline pin code.

For instance, the information of the number of retries of offline pin code is 0x9F 0x17 0x01 0x03, the visual smart card displays 3 via the display device.

Step 210, receives a request input by the user, returns to Step 201 if the returning request is received; the visual smart card powers off if the power-off request is received; otherwise, keeps receiving.

In Embodiment 3, Step 210 specifically includes: MCU receives the request input by the user via the keys of the input device, it is determined that the power-off request input by the user is received when the MCU detects the power key is pressed down; it is determined that the returning request is received when the returning key is detected pressed down; preferably, can also include: the visual smart card powers off if no key is detected pressed down by the MCU in the preset duration; for instance, the preset duration is 30 seconds.

Step 211, reads the balance information of e-wallet stored inside, and displays the balance of e-wallet via the display device.

Furthermore, in the case that there are multiple of applets supporting inquiring the balance of e-wallet inside the visual smart card, when determines that the information which the user requests to inquire is the balance of e-wallet, further includes: selects the target applet; correspondingly, Step 211 is replaced by Step 211' which includes: reads the balance information of e-wallet of the target applet stored inside, and displays the balance of e-wallet of the target applet via the display device.

For instance, the balance information of the e-wallet is 0x00 0x00 0x0B 0xF4, the visual smart card displays 30.60.

Step 212, receives a request input by the user, returns to Step 201 if the returning request is received; the visual smart card powers off if the power-off request is received; otherwise, keeps receiving.

In Embodiment 3, Step 212 specifically includes: MCU receives the request input by the user via the keys of the input device, it is determined that the power-off request input by the user is received when the MCU detects the power key is pressed down; it is determined that the returning request is received when the returning key is pressed down; preferably, can also include: the visual smart card powers off if no key is detected pressed down by MCU in the preset duration; for instance, the preset duration is 30 seconds.

In Embodiment 3, Step 213 and Step 214 specifically are as followed:

Step 213, reads the latest record information of the transaction record stored inside, and displays the transaction record of the previous time via the display device;

Furthermore, in the case that there are multiple of applets supporting inquiring the previous transaction record inside the visual smart card, when the information which the user requests to inquire is the previous transaction record, the step further includes that selects the target applet; correspondingly, Step 213 is replaced by Step 213' which includes that reads the latest record information of the target applet in the transaction logs stored inside, and displays the previous transaction record of the target applet via the display device.

For instance, the previous transaction record information is 0xA0 0x00 0x00 0x03 0x33 0x01 0x01, electronic cash transaction 15-09-06 13:55:40, the transaction fails errcode: 1000, the visual smart card displays 15-09-06 13:55:40 via the display device, the electronic cash transaction: the transaction fails errcode: 1000.

Step 214, receives a request from the user, returns to Step 201 if the returning request is received; the visual smart card powers off if the power-off request is received; otherwise, keeps receiving.

In Embodiment 3, Step 214 specifically includes: MCU receives the request input by the user via the keys of the input device, it is determined that the power-off request input by the user is received when the MCU detects the power key is pressed down; it is determined that the returning request is received when the returning key is pressed down; preferably, can also include: the visual smart card powers off if no key is detected for being pressed down by MCU in the preset duration; for instance, the preset duration is 30 seconds.

In Embodiment 3, Step 215 and Step 216 are described as follows:

Step 215, reads the record information in the transaction logs stored inside, and displays the transaction records via the display device;

Furthermore, in the case that there are multiple of applets supporting inquiring transaction records inside the visual smart card, when it is determined that the information which the user requests to inquire is the transaction records, the step further includes that selects the target applet; correspondingly, Step 215 is replaced by Step 215' which includes reads the record information of the target applet in the transaction logs stored inside, and displays the transaction records of the target applet via the display device.

Step 216, receives a request input by the user, returns to Step 201 if the returning request is received; the visual smart card powers off if the power-off request is received; otherwise, keeps receiving.

In Embodiment 3, Step 216 specifically includes: MCU receives the request input by the user via the keys of the input device, it is determined that the power-off request input by the user is received when the MCU detects the power key is pressed down; it is determined that the returning request is received when the returning key is pressed down; preferably, can also include: the visual smart card powers off if no key is detected for being pressed down by MCU in the preset duration; for instance, the preset duration is 30 seconds.

In Embodiment 3, Step 217 and Step 218 are described as followed:

Step 217, reads the supplementary information records stored inside, and displays the supplementary information via the display device;

Furthermore, in the case that there are multiple of applets supporting inquiring the supplementary information inside the visual smart card, when it is determined that the information which the user requests to inquire is the supplementary information, the step further includes: selects the target applet; correspondingly, Step 217 is replaced by Step 217' which includes reads the supplementary information of the target applet stored inside, and displays the supplementary information of the target applet via the display device.

Step 218, receives a request input by the user, returns to Step 201 if the returning request is received; the visual smart card powers off if the power-off request is received; otherwise, keeps receiving.

In Embodiment 3, Step 218 specifically includes: MCU receives the request input by the user via the keys of the input device, it is determined that the power-off request input by the user is received when the MCU detects the power key is pressed down; it is determined that the returning request is received when the returning key is pressed down; preferably, can also include: the visual smart card powers off if no key is detected for being pressed down by MCU in the preset duration; for instance, the preset duration is 30 seconds.

In Embodiment 3, the power key, the first inquiring key, the second inquiring key, the third inquiring key, the fourth inquiring key, the fifth inquiring key, the sixth inquiring key, the seventh inquiring key, the returning key, the page turning key, the OK key and the number key are function keys, each function key can correspond to the physical buttons of the input device in the manner of one-to-one, one-to-many or many-to-one, etc. The realization of each function key will not be specifically limited.

In Embodiment 3, Step 203 can specifically include:

Step 203-1, MCU sends the instruction for selecting applet to the smart card chip, and receives the response to the instruction for selecting applet returned from the smart card chip;

Specifically, the format of the instruction for selecting applet can specifically be 0x00 0xA4 0x04 0x00 (the length of AID) AID; in which, the AID is the AID of a preset applet.

For instance, the AID of the preset applet is 0xA0 0x00 0x00 0x03 0x33 0x01 0x01, the instruction for selecting applet sent to the smart card chip from MCU is 0x00 0xA4 0x04 0x00 0x07 0xA0 0x00 0x00 0x03 0x33 0x01 0x01.

The response to the instruction for selecting applet is returned to MCU according to the AID selecting applet of the preset applet in the instruction for selecting applet after the smart card chip receives the instruction for selecting applet.

Step 203-2, MCU sends an instruction for reading balance of electronic cash to the smart card chip, and receives balance information of electronic cash returned from the smart card chip;

For instance, MCU sends 0x80 0xCA 0x9F 0x79 0x00 to the smart card chip, the balance information of the electronic cash returned from the smart card chip is 0x9F 0x79 0x06 0x00 0x00 0x00 0x01 0x00 0x00.

Furthermore, Step 203-2 can specifically include: MCU sends a first instruction for reading balance of electronic cash to the smart card chip, receives length information of the balance information of electronic cash, parses the length information of the balance information of electronic cash to obtain the length of the balance information of electronic cash, and sends a second instruction for reading the balance of electronic cash to the smart card chip according to the length of the balance information of electronic cash, and receives the balance information of electronic cash returned from the smart card chip;

For instance, the first instruction for reading the balance of electronic cash is 0x80 0xCA 0x9F 0x79 0x00, the length information of the balance information of electronic cash returned from the smart card chip is 0x6C 0x09, the length of the balance information of electronic cash, which is obtained by MCU parsing the length information of the balance information of electronic cash, is 0x09 which means the length is 9 bytes, the second instruction for reading the balance of electronic cash is 0x80 0xCA 0x9F 0x79 0x09, the balance information of electronic cash returned from the smart card chip is 0x9F 0x79 0x06 0x00 0x00 0x00 0x01 0x00 0x00.

Step 203-3, MCU parses the balance information of electronic cash to obtain the balance of electronic cash, and displays the balance of electronic cash via the display device.

For instance, the balance information of electronic cash is 0x9F 0x79 0x06 0x00 0x00 0x00 0x01 0x00 0x00, the balance of electronic cash obtained by parsing is 10000, the type of electronic cash is defaulted as RMB, and the balance of electronic cash, which is displayed via the display device, is 100.00 yuan.

In Embodiment 3, Step 203' can specifically include:

Step 203'-1, MCU sends the instruction for selecting applet to the smart card chip, and receives the response to the instruction for selecting applet returned from the smart card chip;

Specifically, the format of the instruction for selecting applet can specifically be 0x00 0xA4 0x04 0x00 (the length of applet AID) applet AID; in which, the applet AID is the AID of the target applet.

The smart card chip selects applet according to the AID of the target applet in the instruction for selecting applet after receiving the instruction for selecting applet, and returns the response to the instruction for selecting applet to MCU.

Step 203'-2, MCU sends an instruction for reading electronic cash balance of target applet, and receives information of the electronic cash balance of target applet returned from the smart card chip;

Step 203'-3, MCU parses the information of the electronic cash balance of target applet to obtain the electronic cash balance of target applet, and displays the electronic cash balance of target applet via the display device.

In Embodiment 3, Step 205 can specifically include:

Step 205-1, MCU sends the instruction for selecting applet to the smart card chip, and receives the response to the instruction for selecting applet returned from the smart card chip;

The smart card chip selects applet according to the AID of the target applet in the instruction for selecting applet after receiving the instruction for selecting applet, and returns the response to the instruction for selecting applet to MCU.

Step 205-2, MCU obtains the transaction-record-file information according to the response to the instruction for selecting applet;

In Embodiment 3, Step 205-2 specifically includes: MCU locates a preset label from the response to the instruction for selecting applet, and obtains the length of the transaction-record-file information and the transaction-record-file information successively from the ending position of the preset label;

Specifically, the transaction-record-file information includes a short file identifier (SFI) of the transaction-record-file and the number of transaction records in the transaction-record-file;

The preset label preferably is 0x9F 0x4D;

For instance, the response to the instruction for selecting applet returned from the smart card chip is 0x6F 0x34 0x84 0x07 0xA0 0x00 0x00 0x03 0x33 0x01 0x01 0xA5 0x29 0x50 0x0B 0x50 0x42 0x4F 0x43 0x20 0x43 0x52 0x45 0x44 0x49 0x54 0x87 0x01 0x01 0x9F 0x38 0x09 0x9F 0x7A 0x01 0x9F 0x02 0x06 0x5F 0x2A 0x02 0x5F 0x2D 0x02 0x7A 0x68 0xBF 0x0C 0x05 0x9F 0x4D 0x02 0x0B 0x0A; MCU firstly reads one byte of data from the ending position of the preset label to obtain the length of the transaction-record-file information, which is 0x02, that means two bytes, and continues to read one byte of data to obtain SFI of the transaction-record-file, which is 0x0B, and continues to read one byte of data to obtain the number of transaction records from the transaction-record-file, which is 0x0A, that means there are 10 pieces of transaction of records in the transaction-record-file.

Step 205-3, MCU organizes the instruction for reading electronic-cash transaction record according to the transaction-record-file information;

In Embodiment 3, a format of the instruction for reading electronic cash transaction record can specifically be 0x00 0xB2 record identifier applet control parameter 0x00;

in which the number of transaction records in the transaction record file is made as N, a value of the record identifier is from 0 to N; the applet control parameter is determined by MCU according to the relation of SFI of the transaction record file and the transaction record which is read with the record identifier;

Specifically, the length of the applet control parameter is one byte, the upper 5 bits are SFI of the transaction record file, the lower 3 bits indicate the relation of the transaction record which is read with the record identifier; it means the transaction record which is read is the transaction record which is pointed by the record identifier when the lower 3 bits are 100; it means the transaction records which are read are the transaction records from the transaction record pointed by a self-record identifier in the transaction record file when the lower 3 bits are 101; it means the transaction records which are read are the transaction records from the first piece of transaction record to the transaction record pointed by the record identifier when the lower 3 bits are 110; it means the transaction record which is read is the transaction behind the transaction record pointed by the record identifier when the lower 3 bits are 010; it means the transaction record which is read is the previous transaction record of the transaction record pointed by the record identifier when the lower 3 bits are 011.

For instance, SFI of the transaction record file is 0x0B, the number of the transaction records in the transaction record file is 0x0A, and the tenth piece of the transaction record in the transaction record file will be read, thus the instruction for reading electronic cash transaction record obtained by MCY organizing is 0x00 0xB2 0x0A 0x5C 0x00.

Step 205-4, MCU sends the instruction for reading electronic cash transaction record to the smart card chip, receives the information of electronic cash transaction record returned from the smart card chip;

Step 205-5, MCU parses the information of electronic cash transaction record to obtain the electronic cash transaction record, and displays the electronic cash transaction record via the display device.

Specifically, MCU parses the information of electronic cash transaction record according to a transaction record format; in which, the transaction record format is a preset transaction record format, or, before Step 205-5, the method further includes:

Step i, MCU sends an instruction for obtaining transaction record format to the smart card chip, and receives information of transaction record format returned from the smart card chip;

For instance, the instruction for obtaining transaction record format is 0x80 0xCA 0x9F 0x4F 0x00, the information of transaction record format returned from the smart card chip is 0x9F 0x4F 0x19 0x9A 0x03 0x9F 0x21 0x03 0x9F 0x02 0x06 0x9F 0x03 0x06 0x9F 0x1A 0x02 0x5F 0x2A 0x02 0x9F 0x4E 0x14 0x9C 0x01 0x9F 0x36 0x02;

Furthermore, Step i can specifically include: MCU sends a first instruction for obtaining transaction record format to the smart card chip, and receives length information of the information of transaction record format returned from the smart card chip, parses the length information to obtain the length of the information of transaction record format, and sends a second obtaining-transaction-record-format instruction to the smart card chip according to the length of the transaction-record-format information, and receives the transaction-record-format information returned from the smart card chip;

For instance, the first obtaining-transaction-record-format instruction is 0x80 0xCA 0x9F 0x4F 0x00, the length information of the transaction-record-format information returned from the smart card chip is 0x6C 0x1C, the length of the transaction-record-format information parsed by MCU from the length information of the transaction-record-format is 0x1C, that means the length is 28 bytes, the second obtaining-transaction-record-format instruction is 0x80 0xCA 0x9F 0x4F 0x1C, the transaction-record-format information returned from the smart card chip is 0x9F 0x4F 0x19 0x9A 0x03 0x9F 0x21 0x03 0x9F 0x02 0x06 0x9F 0x03 0x06 0x9F 0x1A 0x02 0x5F 0x2A 0x02 0x9F 0x4E 0x14 0x9C 0x01 0x9F 0x36 0x02;

Step ii, MCU parses the transaction-record-format information to obtain the transaction record format;

For instance, the transaction-record-format information is 0x9F 0x4F 0x19 0x9A 0x03 0x9F 0x21 0x03 0x9F 0x02 0x06 0x9F 0x03 0x06 0x9F 0x1A 0x02 0x5F 0x2A 0x02 0x9F 0x4E 0x14 0x9C 0x01 0x9F 0x36 0x02, the transaction record format obtained by parsing is that the bytes from the first byte to the third byte are a transaction date, the bytes from the fourth byte to the sixth byte are a transaction time, the bytes from the seventh byte to the twelfth byte are authorized amount, the bytes from the thirtieth byte to the eighth byte are other amount, the bytes from the ninth byte to the twentieth byte are terminal country code, the bytes from twenty-first byte to the twenty-second byte are transaction currency code, the bytes from the twenty-third byte to the forty-second byte are merchant name, the forty-third byte is transaction type, the bytes from the forth-fourth byte to the forth-fifth byte are applet transaction counter;

For instance, the electronic cash transaction record is 0x15 0x09 0x06 0x13 0x55 0x40 0x00 0x00 0x00 0x00 0x01 0x23 0x00 0x00 0x00 0x00 0x0D 0x00 0x08 0x40 0x08 0x40 0x00 0x00 0x00 0x00 0x00 0x00 0x00 0x00 0x00 0x00 00 0x00 0x00 0x00 0x00 0x00 0x00 0x00 0x00 0x00 0x0F 0x00 0x51; a parsed result obtained by parsing the record is: transaction date—0x15 0x09 0x06, transaction time—0x13 0x55 0x40, authorized amount—0x00 0x00 0x00 0x00 0x01 0x23, other amount—0x00 0x00 0x00 0x00 0x0D 0x0, terminal country code—0x08 0x40, transaction currency code—0x08 0x40, merchant name—0x00 0x00 0x00 0x00 0x00 0x00 0x00 0x00 0x00 0x00 0x00 0x00 0x00 0x00 0x00 0x00 0x00 0x00 0x00 0x00, transaction type—0x0F, applet transaction counter—0x00 0x51; the electronic cash transaction record displayed via the display device is: the transaction date: 15-09-06, the transaction time: 13:55:40, the authorized amount: 1.23, other amount: 0.00, the terminal country code: 0840, the transaction currency code: 0840, the merchant name: the transaction type: other, the applet transaction counter: 0051.

In Embodiment 3, Step 205' can specifically include:

Step 205'-1, MCU sends the instruction for selecting applet to the smart card chip, receives the response to the instruction for selecting applet returned from the smart card chip;

The smart card chip selects an applet according to AID of the target applet from the instruction for selecting applet after receiving the instruction for selecting applet, and returns the response to the instruction for selecting applet to MCU.

Step 205'-2, MCU obtains the transaction-record-file information according to the response to the instruction for selecting applet, and organizes a reading-target-applet-electronic-cash-transaction-record instruction according to the transaction-record-file information;

Step 205'-3, MCU sends the reading-target-applet-electronic-cash-transaction-record instruction to the smart card chip, and receives the electronic-cash-transaction-record information returned from the smart card chip;

Step 205'-4, MCU parses the electronic-cash-transaction-record information to obtain the electronic-cash-transaction-record of the target applet, and displays the electronic-cash-transaction-record of the target applet via the display device.

Specifically, MCU parses the electronic-cash-transaction-record information according to the transaction record format; in which, the transaction record format is a preset transaction record format, or, before Step 205'-4, the method further includes: MCU sends the obtaining-transaction-record-format instruction to the smart card, and receives the transaction-record-format information returned from the smart card chip; MCU parses the transaction-record-format information to obtain the transaction record format.

In Embodiment 3, Step 207 can specifically include:

Step 207-1, MCU sends the instruction for selecting applet to the smart card chip, and receives the response to the instruction for selecting applet returned from the smart card chip;

The smart card chip selects an applet according to AID of the preset applet in the instruction for selecting applet after the instruction for selecting applet is received, and returns the response to the instruction for selecting applet to MCU.

Step 207-2, MCU sends a reading-member-points-information instruction to the smart card chip, receives the member-points-information returned from the smart card chip;

For instance, MCU sends 0x80 0xCA 0x9F 0x79 0x00 to the smart card chip, the member-points-information returned from the smart card chip is 0x9F 0x79 0x06 0x00 0x00 0x00 0x01 0x00 0x00.

Furthermore, Step 207-2 can specifically include: MCU sends a first reading-member-points-information instruction to the smart card chip, receives length information of the member-points-information returned from the smart card chip, parses the length information of the member-points-information to obtain the length of the member-points-information, and sends a second reading-member-points-information instruction to the smart card chip according to the length of the member-points-information, and receives the member-points-information returned from the smart card chip;

For instance, the first reading-member-points-information instruction is 0x80 0xCA 0x9F 0x79 0x00, the length information of the member-points-information returned from the smart card chip is 0x6C 0x09, the length of the member-points-information obtained by MCU parsing the length information of member-points-information is 0x09, which means 9 bytes, the second reading-member-points-information instruction is 0x80 0xCA 0x9F 0x79 0x09, the member-points-information returned from the smart card chip is 0x9F 0x79 0x06 0x00 0x00 0x00 0x01 0x00 0x00.

Step 207-3, MCU parses the member-points-information, and displays the member-points-information according to a parsed result via the display device.

For instance, the member-points-information is 0x9F 0x79 0x06 0x00 0x00 0x00 0x00 0x10 0x00, the member points is 1000, because the default type of member points is consumption points, the member-points information displayed via the display device is: consumption points 1000.

In Embodiment 3, Step 207' can specifically include:

Step 207'-1, MCU sends the selecting applet instruction to the smart card chip, and receives the response to the selecting applet instruction returned from the smart card chip;

The smart card chip selects an applet according to AID of the target applet in the selecting applet instruction after the selecting applet instruction is received, and returns the response to the selecting applet instruction to MCU.

Step 207'-2, MCU sends the reading-target-applet-member-points-information instruction to the smart card chip, and receives the target applet member-points-information returned from the smart card chip.

Step 207'-3, MCU parses the target applet member-points-information, and displays the target applet member-points-information via the display device according to the parsed result.

In Embodiment 3, Step 209 specifically includes:

Step 209-1, MCU sends the selecting applet instruction to the smart card chip, and receives the response to the selecting applet instruction returned from the smart card chip;

The smart card chip selects an applet according to AID of the target applet in the selecting applet instruction after the selecting applet instruction is received, and returns the response to the selecting applet instruction to MCU.

Step 209-2, MCU sends a reading-number-of-retries-of-offline-pin-code instruction to the smart card chip, and receives information of number-of-retries-of-offline-pin-code returned from the smart card chip; For instance, if MCU sends 0x80 0xCA 0x9F 0x17 0x00 to the smart card chip, the information of number-of-retries-of-offline-pin-code returned from the smart card chip is 0x9F 0x17 0x01 0x03.

Furthermore, Step 208-2 can specifically include: MCU sends a first reading-number-of-retries-of offline-pin-code instruction to the smart card chip, receives length information of the information of number-of-retries-of-offline-pin-code returned from the smart card chip, parses the length information of the information of number-of-retries-of-offline-pin-code to obtain the length of the information of number-of-retries-of-offline-pin-code, sends a second reading-number-of-retries-of-offline-pin-code instruction to the smart card chip according to the length of the information of number-of-retries-of-offline-pin-code, and receives the information of number-of-retries-of-offline-pin-code returned from the smart card chip;

For instance, the first reading-number-of-retries-of-offline-pin-code instruction is 0x80 0xCA 0x9F 0x17 0x00, the said length information is 0x6C 0x04, MCU parses the length information of the information of number-of-retries-of-offline-pin-code to obtain the length of the information of number-of-retries-of-offline-pin-code is 0x04, which means 4 bytes, the second reading-number-of-retries-of-offline-pin-code instruction is 0x80 0xCA 0x9F 0x17 0x04, the information of number-of-retries-of-offline-pin-code returned from the smart card chip is 0x9F 0x17 0x01 0x03.

Step 209-3, MCU parses the number-of-retries-of-offline-pin-code information to obtain the number of retries of offline pin code, and displays the number of retries of offline pin code via the display device.

For instance, the number-of-retries-of-offline-pin-code information is 0x9F 0x17 0x01 0x03, the number of retries of offline pin code is 0x03, which means 3 times, the number of retries of offline pin code displayed via the display device is that the number of retries of offline pin code is 3 times.

In Embodiment 3, Step 211 can specifically include:

Step 211-1, MCU sends the selecting applet instruction to the smart card chip, and receives the response to the selecting applet instruction returned from the smart card chip;

The smart card chip selects an applet according to AID of the target applet in the selecting applet instruction after the selecting applet instruction is received, and returns the response to the selecting applet instruction to MCU.

Step 211-2, MCU sends a reading-electronic-wallet-balance instruction, and receives balance information of electronic wallet returned from the smart card chip;

In Embodiment 3, the reading-electronic-wallet-balance instruction is 0x80 0x5C 0x00 0x02 0x04.

Step 211-3, MCU parses the balance information of electronic wallet to obtain the electronic wallet balance, and displays the electronic wallet balance via the display device.

For instance, the balance information of electronic wallet is 0x80 0x5C 0x00 0x02 0x04, and MCU converts the balance information of electronic wallet to a decimal number to obtain a decimal number of 3060, and displays the electronic wallet balance as 30.60 via the display device.

In Embodiment 3, step 211' can specifically include:

Step 211'-1, MCU sends the selecting applet instruction to the smart card chip, and receives the response to the selecting applet instruction returned from the smart card chip;

The smart card chip selects an applet according to AID of the target applet in the selecting applet instruction after the selecting applet instruction is received, and returns the response to the selecting applet instruction to MCU.

Step 211'-2, MCU sends a reading-target-applet-electronic-wallet-balance instruction to the smart card chip, and receives balance information of target-applet-electronic-wallet returned from the smart card chip;

Step 211'-3, MCU parses the balance information of target-applet-electronic-wallet to obtain the target applet electronic wallet balance, and displays the target applet electronic wallet balance via the display device.

Step 213 can specifically include:

Step 213-1, MCU reads self-stored transaction logs, and reads the latest piece of record information in the transaction logs;

Step 213-2, MCU parses the record information obtained to obtain a previous transaction record, and displays the previous transaction record via the display device.

In Embodiment 3, the transaction record can specifically be a transaction result or a transaction detail including the transaction result; taking the transaction detail for an example, the read record information includes electronic cash transaction 15-09-06 13:55:40 transaction fails errcode: 1000; the previous transaction record displayed by MCU via the display device includes 15-09-06 13:55:40 electronic cash transaction: transaction fails errcode: 1000.

In Embodiment 3, Step 213' can specifically include:

Step 213-1', MCU reads the self-stored transaction logs, searches from the transaction logs according to AID of the target applet to obtain the latest piece record information of the target applet;

Step 213-2', MCU parses the obtained record information to obtain a previous transaction record of the target applet, and displays the previous transaction record of the target applet.

In Embodiment 3, Step 215 can specifically include:

Step 215-1, MCU reads the self-stored transaction logs, and obtains the latest piece of record information from the transaction logs;

Step 215-2, MCU makes the read record information as the current record information, parses the current record information to obtain a current transaction record, and displays the current transaction record via the display device;

Step 215-3, MCU receives a request from the user via the input device, goes to Step 215-4 if the request is a page-up request; goes to Step 215-5 if the request is a page-down request;

Furthermore, Step 215-3 can also include: the visual smart card powers off if the request is a power-off request, and/or returns to Step 201 if a returning request is received.

Furthermore, Step 215-3 can also include: the visual smart card powers off if there is no request received in a preset duration; for instance, the preset duration is 30 seconds.

Step 215-4, MCU tries to obtain a previous piece of record information of the current record information from the transaction logs, returns to Step 215-2 if the previous piece of record information is obtained; displays corresponding information via the display device if there is no record information obtained;

Step 215-5, MCU tries to obtain a next piece of record information of the current record information from the transaction logs, returns to Step 215-2 if the next piece of record information is obtained; displays the corresponding information via the display device if there is no record information obtained.

In Embodiment 3, Step 215' can specifically include:

Step 215'-1', MCU reads transaction logs stored inside, and searches from the transaction logs according to AID of the target applet to obtain the latest piece of record information of the target applet;

Step 215'-2', MCU makes the obtained record information as the current record information, parses the current record information of the target applet to obtain the current transaction record of the target applet, and displays the current transaction record of the target applet via the display device;

Step 215'-3', MCU receives the request input by the user via the input device, goes to Step 215'-4 if the request is the page up request; goes to Step 215'-5 if the request is the page down request;

Furthermore, Step 215'-3 can also include: the visual smart card powers off if the request is the power-off request, and/or returns to Step 201 if the request is the returning request.

Furthermore, Step 215'-3 can also include: the visual smart card powers off if no request is received in the preset duration; for instance, the preset duration is 30 seconds.

Step 215'-4', MCU searches from the transaction logs to try to obtain the previous piece of record information of the target applet, returns to Step 215'-2' if the previous piece of record information of the target applet is obtained; displays the corresponding information via the display device if the previous piece of record information is not obtained;

Step 215'-5', MCU searches from the transaction logs to try to obtain the next piece of record information of the target applet, returns to Step 215'-2 if the next piece of record information of the target applet is obtained; displays the corresponding information via the display device if the next piece of record information of the target applet is not obtained.

In Embodiment 3, Step 217 can specifically include:

Step 217-1, MCU sends the selecting applet instruction to the smart card chip, and receives the response to the selecting applet instruction returned from the smart card chip;

The smart card chip selects an applet according to AID of a preset applet in the selecting applet instruction after the selecting applet instruction is received, and returns the response to the selecting applet instruction to MCU.

Step 217-2, MCU sends a reading-supplementary-information-record to the smart card chip according to a file locator in the response to the selecting applet instruction, and receives the supplementary information record returned from the smart card chip;

Step 217-3, MCU parses the supplementary information record to obtain the supplementary information, and displays the supplementary information via the display device.

Furthermore, before displaying the supplementary information via the display device, the method further includes: MCU generates searchable supplementary information item, which corresponds to the supplementary information, and displays the searchable supplementary information item via the display device, and receives choice of the supplementary information item from the user; correspondingly, displaying the supplementary information via the display device specifically includes displaying the supplementary information corresponding to the item chosen by the user via the display device.

In Embodiment 3, the supplementary information can include coupon information and/or discount coupon information and/or customer manager information.

In Embodiment 3, Step 217' can specifically include:

Step 217'-1, MCU sends the selecting applet instruction to the smart card chip, and receives the response to the selecting applet instruction returned from the smart card chip;

The smart card chip selects an applet according to AID of the target applet in the selecting applet instruction after the selecting applet instruction is received, and returns the response to the selecting applet instruction to MCU.

Step 217'-2, MCU obtains supplementary-information-record-file information according to the response to the selecting applet instruction, organizes the reading-target-applet-supplementary-information-record instruction according to the supplementary-information-record-file information;

Step 217'-3, MCU sends the reading-target-applet-supplementary-information-record instruction to the smart card chip, and receives the supplementary information record of the target applet returned from the smart card chip;

Step 217'-4, MCU parses the supplementary information record of the target applet to obtain the supplementary information of the target applet, and displays the supplementary information of the target applet via the display device.

Furthermore, before displaying the supplementary information of the target applet via the display device, the method includes: MCU correspondingly generates the searchable supplementary information item according to the supplementary information obtained by parsing, displays the searchable supplementary information item via the display device, receives choice for the supplementary information item from the user; correspondingly, displaying the supplementary information via the display device specifically is that displays the supplementary information corresponding to item chosen by the user via the display device.

Preferably, in Embodiment 3, selecting the target applet specifically includes:

Step 2-1, MCU displays information of applet supporting inquiry via the display device;

For instance, MCU displays information, such as a name, an abbreviation or an introduction, of the applet supporting inquiry;

Step 2-2, MCU receives the choice from the user via the input device, and determines the target applet according to the user's choice.

In which, Step 2-1 can specifically include: MCU displays a menu of the information of applet supporting inquiry via the display device, and makes one piece of applet information in the menu as a current applet information and displays reversely the applet information when the menu is displayed; correspondingly, Step 2-2 specifically includes:

Step 3-1, MCU detects key input via the input device, and determines the type of the key when the key input is detected, the visual smart card powers off if the key is the power key; returns to Step 201 if the key is the returning key; goes to Step 3-2 if the key is the page-turning key; goes to Step 3-3 if the key is the OK key; otherwise, keeps detecting the key input;

Preferably, Step 3-1 further includes: the visual smart card powers off if no key input is detected in the preset duration; for instance, the preset duration is 30 seconds.

Step 3-2, MCU makes the corresponding applet information in the menu as the current applet information and displays reversely the applet information, and returns to Step 3-1;

For instance, the page-turning keys include the page-up key and the page-down key, the applet information reversely displayed in the menu via the display device is the second applet information in the menu when MCU detects there is key input, MCU determines the type of the key, it will not displays reversely the second applet information if the key is the page-up key, and make the first applet information in the menu as the current applet information and reversely display the applet information, in a similar way, it will not reversely display the second apple information if the key is the page-down key, and make the third applet information in the menu as the current applet information and reversely display the applet information.

Step 3-3, MCU determines that the applet corresponding to the current applet information reversely displayed is the target applet.

Or, Step 2-1 specifically includes MCU displays the menu including the applet information supporting inquiry via the display device, and displays a serial number of the applet information in the menu when the menu is displayed; correspondingly, Step 2-2 specifically includes:

Step 4-1, MCU tries to detect the key input via the input device, determines the type of the key when the key input is detected, the visual smart card powers off if the key is the power key; returns to Step 201 if the key is the returning key; goes to Step 4-2 if the key is a corresponding number key; otherwise, keeps trying to detect the key input;

For instance, the number keys include keys from the number key 0 to the number key 9, in the case that there are two applets supporting inquiring the electronic cash balance in the visual smart card, MCU displays the information of the two applets via the display device, and the serial number 1 and 2 of the two applets respectively, and the corresponding number keys are the number key 1 and the number key 2;

Preferably, Step 4-1 further includes: the visual smart card powers off if no key input in the preset duration; for instance, the preset duration is 30 seconds.

Step 4-2, MCU determines the applet corresponding to the applet information with a corresponding serial number is the target applet according to the corresponding relation between the number keys and the serial numbers of the applet information.

For instance, if the corresponding number key is 1, the applet corresponding to the applet information, of which the serial number is 1, is the target applet.

Embodiment 4

Figure 4:
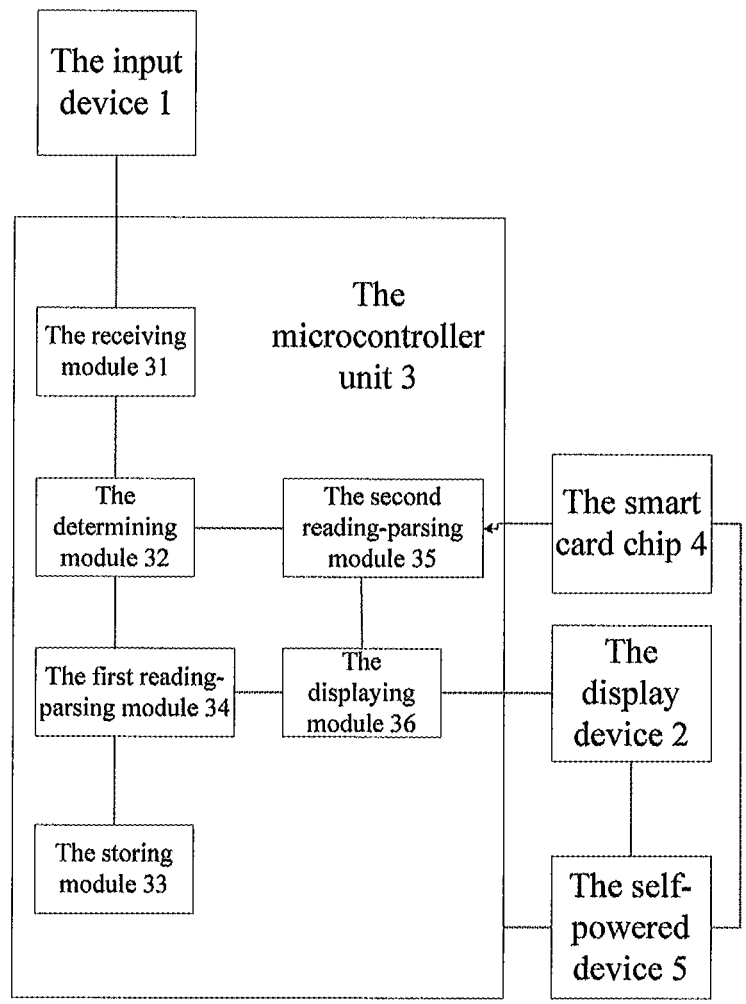
FIG. 4 provides a structured block diagram of a visual smart card.

As shown in FIG. 4, it provides a visual smart card, including an input device 1, a display device 2, a microcontroller unit 3, a smart card chip 4 and a self-powered device 5, in which the microcontroller unit 3 includes:

a receiving module 31 which is configured to receive an inquiring request via the input device;

a determining module 32 which is configured to determine information that the user requests to inquire when the receiving module 31 receives the inquiring request;

a storing module 33 which is configured to store a first information record;

a first reading-parsing module 34, which is configured to read the first information record stored in the storing module 33 when the determining module 32 determines that the information that the user requests to inquire is the first information, and parse the first information record to obtain the first information;

a second reading-parsing module 35, which is configured to send a selecting applet instruction to the smart card chip 4 when the determining module 32 determines the information that the user requests to inquire is the second information, receive a response to the selecting applet instruction returned from the smart card chip 4, send a reading-information-record instruction to the smart card chip 4, receive a second information record from the smart card chip, and parse the second information record to obtain the second information;

a displaying module 36, which is configured to display the first information obtained by the first reading-parsing module 34 and the second information obtained by the second reading-parsing module 35 via the display device 2.

In Embodiment 4, the storing module 33 can specifically be configured to store transaction logs, correspondingly:

the first reading-parsing module 34 is specifically configured to read the transaction logs stored in the storing module 33 when the determining module 32 determines that the information which the user requests to inquire is the first information, and obtain the latest record information from the transaction log, and parse the obtained record information to obtain a previous transaction record; the displaying module 36 is specifically configured to display the previous transaction record obtained by the first reading-parsing module 34 via the display device 2;

or, the receiving module 31 is further configured to receive a page-turning request input by the user via the input device 1 when the displaying module 36 displays the first information; the first reading-parsing module 34 specifically includes:

a reading unit, which is configured to read the transaction logs stored in the storing module 33 when the determining module 32 determines that the information that the user request to inquire is the first information;

a first obtaining unit, which is configured to obtain the latest piece of record information read by the reading unit from the transaction logs, and make the read record information as a current record information;

a second obtaining unit, which is configured to obtain a previous piece of the record information of the current record information from the transaction logs read by the reading unit when the receiving module 31 receives a page-up request;

a third obtaining unit, which is configured to obtain the next piece of the record information of the current record information from the transaction logs read by the reading unit when the receiving module 31 receives a page-down request;

a parsing unit, which is configured to parse the record information obtained by the first obtaining unit, the second obtaining unit and the third obtaining unit to obtain the transaction records;

the displaying module 36, which is configured to display the transaction records obtained by the parsing unit via the display device 2; which is further configured to display corresponding information when the second obtaining unit and the third obtaining unit cannot obtain record information;

or, the microcontroller unit 3 further includes a selecting module, which is configured to select the target applet; the first reading-parsing module 34, which is configured to read the transaction logs stored in the storing module 33 when the determining module 32 determines the information that the user requests to inquire is the first information, and search from the transaction logs according to AID of the target applet chosen by the choice module and obtain the latest piece of record information, and parse the obtained record information to obtain the previous transaction log of the target applet; the displaying module 36, which is configured to display the previous transaction log of the target applet obtained by the first reading-parsing module 34 via the display device 2;

or, the microcontroller unit 3 further includes: the selecting module, which is configured to select the target applet; the receiving module 31 is further configured to receive the page-turning request input by the user via the input device 1 when the displaying module 36 displays the first information; the first reading-parsing module 34 specifically includes:

a reading unit, which is configured to read the transaction logs stored in the storing module 33 when the determining module 32 determines that the information that the user requests to inquire is the first information;

a first obtaining unit, which is configured to search from the transaction logs read by the reading unit according to AID of the target applet chosen by the selecting module to obtain the latest piece of the record information of the target applet, and make the obtained record information as the current record information;

a second obtaining unit, which is configured to search from the transaction logs read by the reading unit when the receiving module 31 receives the page-up request to obtain the previous piece of record information of the target applet;

a third obtaining unit, which is configured to search from the transaction logs read by the reading unit when the receiving module 31 receives the page-down request to obtain the next piece of record information of the target applet;

a parsing unit, which is configured to parse the record information, which is obtained by the first obtaining unit, the second obtaining unit and the third obtaining unit, to obtain the transaction record;

the displaying module 36, which is configured to display the transaction record obtained by the parsing unit via the display device 2, and to display corresponding information via the displaying device 2 when the first obtaining unit and the second obtaining unit cannot obtain the record information.

Furthermore, the first reading-parsing module 34 is configured to parse the record information to obtain a transaction record or a transaction detail; the displaying module 36 is specifically configured to display the transaction result or the transaction detail obtained by the first reading-parsing module 34 via the display device 2.

In Embodiment 4, the receiving module 31 is further configured to receive the returning request input by the user via the input device 1 when the displaying module 36 displays the first information and the second information, and the visual smart card powers off if the returning request is not received in the preset duration.

In Embodiment 4, the second reading-parsing module 35 can specifically include:

a selecting unit, which is configured to send the selecting applet instruction to the smart card chip 4, and receive the response to the selecting applet instruction returned from the smart card chip;

a reading unit, which is configured to send the reading-electronic-cash-balance instruction to the smart card chip 4, and receive the electronic cash balance information returned from the smart card chip 4;

a parsing unit, which is configured to parse the electronic cash balance information received by the reading unit to obtain the electronic cash balance;

correspondingly, the displaying module 36 is specifically configured to display the electronic cash balance obtained by the parsing unit via the display device 2.

Or, in Embodiment 4, the microcontroller unit 3 further includes: a selecting module, which is configured to select the target applet; correspondingly, the second reading-parsing module 35 specifically includes:

the selecting unit, which is configured to send the selecting applet instruction to the smart card chip 4, and receive the response to the selecting applet instruction returned from the smart card chip 4;

the reading unit, which is configured to send the reading-target-applet-electronic-cash-balance instruction to the smart card chip 4, and receive the information of the electronic cash balance of the target applet returned from the smart card chip 4;

the parsing unit, which is configured to parse the information of the electronic cash balance of the target applet, which is received by the reading unit, to obtain the electronic cash balance of the target applet;

the displaying module 36 is specifically configured to display the electronic cash balance of the target applet obtained by the parsing unit via the displaying device 2.

In Embodiment 4, the second reading-parsing module 35 can specifically include:

the selecting unit, which is configured to send the selecting applet instruction to the smart card chip 4, and receive the response to the selecting applet instruction returned from the smart card chip 4;

an organizing unit, which is configured to obtain the transaction-record-file information according to the response to the selecting applet instruction received by the selecting unit, and organize the reading-electronic-cash-transaction-record instruction according to the transaction-record-file information;

the reading unit, which is configured to send the reading-electronic-cash-transaction-record instruction organized by the organizing unit to the smart card chip 4, and receive the electronic-cash-transaction-record information returned from the smart card chip 4;

the parsing unit, which is configured to parse the electronic-cash-transaction-record information received by the reading unit to obtain the electronic cash transaction record;

the displaying module 36 is specifically configured to display the electronic cash transaction record via the displaying device 2.

Or, in Embodiment 4, the microcontroller unit 3 further includes: the selecting module, which is configured to select the target applet; correspondingly, the second reading-parsing module 35 specifically includes:

the reading unit, which is configured to send the selecting applet instruction to the smart card chip 4, and receive the response to the selecting applet instruction returned from the smart card chip 4;

the organizing unit, which is configured to obtain the transaction-record-file information according to the response to the selecting applet instruction, which is received by the selecting unit, and organize the reading-target-applet-electronic-cash-transaction-record instruction according to the transaction-record-file information;

the reading unit, which is configured to send the reading-target-applet-electronic-cash-transaction-record instruction organized by the organizing unit to the smart card chip 4, and receive the target-applet-electronic-cash-transaction-record information returned from the smart card chip;

the parsing unit, which is configured to parse the electronic-cash-transaction-record information received by the reading unit to obtain the electronic cash transaction record of the target applet;

the displaying module 36 is specifically configured to display the electronic cash transaction record of the target applet obtained by the parsing unit via the displaying device 2.

In Embodiment 4, the microcontroller unit 3 can further include: a preparing for parsing unit, which is configured to send the obtaining-transaction-record-format instruction to the smart card chip 4, and receive the transaction-record-format information returned from the smart card chip 4, and parse the transaction-record-format information to obtain the transaction record format; correspondingly, the parsing unit is specifically configured to parse the electronic-cash-transaction-record information obtained by the reading unit according to the transaction record format obtained by the preparing for parsing unit.

In Embodiment 4, the second reading-parsing module 35, can further include:

the selecting unit, which is configured to send the selecting applet instruction to the smart card chip 4, and receive the response to the selecting applet instruction from the smart card chip 4;

the reading unit, which is configured to send the reading-member-points instruction to the smart card chip 4, and receive the member-points-information from the smart card chip 4;

the parsing unit, which is configured to parse the member-points-information received by the reading unit;

correspondingly, the displaying module 36 is specifically configured to display the member-points-information according to the parsed result from the parsing unit via the displaying device 2.

Or, in Embodiment 4, the microcontroller unit 3 further includes: the selecting module which is configured to select the target applet; correspondingly, the second reading-parsing module 35 specifically includes:

the selecting unit, which is configured to send the selecting applet instruction to the smart card chip 4, and receive the response to the selecting applet instruction from the smart card chip 4;

the reading unit, which is configured to send the reading-target-applet-member-points-information instruction to the smart card chip 4, and receive the target-applet-member-points information from the smart card chip 4;

the parsing unit, which is configured to parse the target-applet-member-points information received by the reading unit;

correspondingly, the displaying module 36 is specifically configured to display the target-applet-member-points information via the displaying device 2 according to the parsed result.

In Embodiment 4, the second reading-parsing module 35 can further includes:

the selecting unit, which is configured to send the selecting applet instruction to the smart card chip 4, and receive the response to the selecting applet instruction from the smart card chip 4;

the reading unit, which is configured to send the reading-number-of-retries-of-offline-pin-code instruction to the smart card chip, and receive the number-of-retries-of-offline-pin-code information from the smart card chip 4;

the parsing unit, which is configured to parse the number-of-retries-of-offline-pin-code information received by the reading unit to obtain the number of retries of offline pin code:

correspondingly, the displaying module 36 is specifically configured to display the number of retries of offline pin code obtained by the parsing unit via the displaying device 2.

In Embodiment 4, the second reading-parsing module 35 can specifically include:

the selecting unit, which is configured to send the selecting applet instruction to the smart card chip 4, and receive the response to the selecting applet instruction from the smart card chip 4;

the reading unit, which is configured to send the reading-electronic-wallet-balance information to the smart card chip 4, and receive the electronic-wallet-balance information from the smart card chip 4;

the parsing unit, which is configured to parse the electronic-wallet-balance information received by the reading unit to obtain the electronic wallet balance;

correspondingly, the displaying module 36 is specifically configured to display the electronic wallet balance obtained by the parsing unit via the displaying device 2.

Or, in Embodiment 4, the microcontroller unit 3 further includes: the selecting module, which is configured to select the target applet; correspondingly, the second reading-parsing module 35 specifically includes:

the selecting unit, which is configured to send the selecting applet instruction to the smart card chip 4, and receive the response to the selecting applet instruction from the smart card chip 4;

the reading unit, which is configured to send the reading-target-applet-electronic-wallet-balance instruction to the smart card chip 4, and receive the target-applet-electronic-wallet-balance information returned from the smart card chip;

the parsing unit, which is configured to parse the target-applet-electronic-wallet-balance information received by the reading unit to obtain the electronic wallet balance of the target applet;

correspondingly, the displaying module 36 is specifically configured to display the electronic wallet balance of the target applet obtained by the parsing unit via the displaying device 2.

In Embodiment 4, the second reading-parsing module 35 can further include:

the selecting unit, which is configured to send the selecting applet instruction to the smart card chip 4, and receive the response to the selecting applet instruction from the smart card chip 4;

the organizing unit, which is configured to obtain the supplementary-information-record-file information according the response to the selecting applet instruction, which is received by the selecting unit, and organize the reading-supplementary-information-record instruction according to the supplementary-information-record-file information;

the reading unit, which is configured to send the reading-supplementary-information-record instruction organized by the organizing unit to the smart card chip 4, and receive the supplementary information record from the smart card chip 4;

the parsing unit, which is configured to parse the supplementary information record received by the reading unit to obtain the supplementary information;

correspondingly, the displaying module 36 is specifically configured to display the supplementary information obtained by the parsing unit via the display device 2.

Or, in Embodiment 4, the microcontroller unit 3 further includes: the selecting module, which is configured to select the target applet; correspondingly, the second reading-parsing module 35 specifically includes:

the selecting unit, which is configured to send the selecting applet instruction to the smart card chip 4, and receive the response to the selecting applet instruction from the smart card chip 4;

the organizing unit, which is configured to obtain the supplementary-information-record-file information according to the response to the selecting applet instruction received by the selecting unit, and organize the reading-target-applet-supplementary-information-record instruction according to the supplementary-information-record-file information;

the reading unit, which is configured to send the reading-target-applet-supplementary-information-record instruction organized by the organizing unit to the smart card chip 4, and receive the supplementary information record of the target applet from smart card chip 4;

the parsing unit, which is configured to parse the supplementary information record of the target applet received by the reading unit to obtain the supplementary information of the target applet;

correspondingly, the displaying module 36 is specifically configured to display the supplementary information of the target applet obtained by the parsing unit via the display device 2.

Furthermore, in Embodiment 4, the microcontroller unit 3 can further include: a generating module, which is configured to generate correspondingly searchable supplementary information item according to the supplementary information obtained by the parsing unit; correspondingly, the display module 36 is further configured to display the searchable supplementary information item generated by the generating module via the display device 2; the receiving module 31, is further configured to receive user's choice for the supplementary information item when the displaying module displays the searchable supplementary information; the displaying module 36 is specifically configured to display the supplementary information corresponding to the item chosen by the user via the display device 2.

Furthermore, in Embodiment 4, the parsing unit is specifically configured to parse the obtained coupon information and/or discount coupon information and/or customer manager information; correspondingly, the displaying module 36 is specifically configured to display the coupon information and/or discount coupon information and/or customer manager information obtained by the parsing unit via the display device 2.

In Embodiment 4, the displaying module 36 is further configured to display the applet information supporting inquiring; correspondingly, the receiving module 31 is further configured to receive user's choice via the input device 1 when the displaying module 36 displays the applet information supporting inquiring; the selecting module is specifically configured to determine the target applet according to the user's choice received by the receiving module 31.

In Embodiment 4, the receiving module 31 is further configured to receive a power-off request input by the user via the input device 1 after the visual smart card powers on; the microcontroller unit 3 can further include: a power-on and power-off module, which is configured to power on the visual smart card and power off the visual smart card when the power-off request is received by the receiving module 31.

The Embodiments described herein are just preferable Embodiments of the present invention. On the basis of the above Embodiments of the invention, all other related Embodiments made by those skilled in the art without any inventive work belong to the scope of the invention.

The invention claimed is:

1. A method for inquiring information in a visual smart card, characterized in that said method is applicable to a visual smart card including an input device, a display device, a microcontroller unit, a smart card chip and a self-powered device, and said method comprises:

Step S1, receiving, by the microcontroller unit, an inquiring request input by a user via the input device, executing Step S2 in the case that the inquiring request is received;

Step S2, determining, by the microcontroller unit, the information which the user requests to inquire according to the inquiring request, executing Step S3 in the case that the information is a first information; executing Step S4 in the case that the information is a second information;

Step S3, reading, by the microcontroller unit, a first information record stored in the microcontroller unit, parsing the first information record to obtain the first information, and displaying the first information via the display device; and Step S4, sending, by the microcontroller unit, a selecting applet instruction to the smart card chip, receiving a response to the selecting applet instruction from the smart card chip, sending a reading-information-record instruction to the smart card chip, receiving a second information record returned from the smart card chip, and parsing the second information record to obtain the second information, and displaying the second information via the display device, the first information is the previous transaction record; and Step S3 specifically comprises: reading, by the microcontroller unit, transaction logs stored in the microcontroller unit, obtaining the latest piece of record information from the transaction logs, and parsing the obtained record information to obtain the previous transaction record, and displaying the previous transaction record via the display device.

2. The method as claimed in claim 1, wherein the first information is the transaction record; and Step S3 specifically comprises:

Step S3-1, reading, by the microcontroller unit, the transaction logs stored in the microcontroller unit, and obtaining the latest piece of record information from the transaction logs;

Step S3-2, making, by the microcontroller unit, the obtained record information as current record information, and parsing the current record information to obtain a current transaction record, and displaying the current transaction record via the display device;

Step S3-3, receiving, by the microcontroller unit, a page-turning request input by a user via the input device;

trying to obtain the previous piece of record information of the current record information from the transaction logs in the case that a page-up request is received, returning to Step S3-2 if the previous piece of record information is obtained; displaying corresponding information via the display device if the previous piece of record information is not obtained; and trying to obtain a next piece of record information of the current record information from the transaction logs in the case that a page-down request is received, and returning to Step S3-2 if the next piece of record information is obtained; displaying corresponding information if the next piece of record information is not obtained.

3. The method as claimed in claim 1, wherein the first information is a previous transaction record;

before Step S3, further comprises: selecting a target applet; and

Step S3 specifically comprises: reading, by the microcontroller unit, the transaction logs stored in the microcontroller unit, searching from the transaction logs according to AID of the target applet and obtaining the latest piece of record information of the target applet, parsing the obtained record information to obtain the previous transaction record of the target applet, and displaying the previous transaction record of the target applet via the display device.

4. The method as claimed in claim 1, wherein the first information is the transaction record;

before Step S3, the method further comprises selecting a target applet; and

Step S3 specifically comprises:

step S3-1, reading, by the microcontroller unit, the transaction logs stored in the microcontroller unit, searching from the transaction logs according to AID of the target applet and obtaining the latest piece of record information of the target applet;

step S3-2, making, by the microcontroller unit, the obtained record information as the current record information, parsing the current record information of the target applet to obtain the current transaction record of the target applet, and displaying the current transaction record of the target applet via the display device;

Step S3-3, receiving, by the microcontroller unit, the page-turning request input by the user via the input device;

searching from the transaction logs and trying to obtain the previous piece of record information of the target applet in the case that the page-up request is received, returning to Step S3-2 if the previous piece of record information is obtained; displaying corresponding information via the display device if the previous piece of record information is not obtained; and searching from the transaction logs and trying to obtain the next piece of record information of the target applet in the case that the page-up request is received, returning to Step S3-2 if the next piece of record information is obtained; and displaying corresponding information via the display device if the next piece of record information is not obtained.

5. The method as claimed in claim 1, wherein the second information is electronic cash balance; and Step S4 specifically comprises:

Step 1-1, sending, by the microcontroller unit, a selecting applet instruction to the smart card chip, and receiving a response to the selecting applet instruction returned from the smart card chip;

Step 1-2, sending, by the microcontroller unit, a reading-electronic-cash-balance instruction to the smart card chip, and receiving electronic-cash-balance information returned from the smart card chip; and Step 1-3, parsing, by the microcontroller unit, the electronic-cash-balance information to obtain the electronic cash balance, and displaying the electronic cash balance via the display device.

6. The method as claimed in claim 1, wherein the second information is an electronic cash transaction record; and Step S4 specifically comprises:

Step 2-1, sending, by the microcontroller unit, the selecting applet instruction to the smart card chip, and receiving the response to the selecting applet instruction returned from the smart card chip;

Step 2-2, obtaining, by the microcontroller unit, transaction-record-file information according to the response to the selecting applet instruction, and organizing a reading-electronic-cash-transaction-record instruction according to the transaction-record-file information;

Step 2-3, sending, by the microcontroller unit, the reading-electronic-cash-transaction-record instruction to the smart card chip, and receiving the electronic-cash-transaction-record information returned from the smart card chip; and Step 2-4, parsing, by the microcontroller unit, the electronic-cash-transaction-record information to obtain the electronic cash transaction record, and displaying the electronic cash transaction record via the displaying device.

7. The method as claimed in claim 6, wherein before parsing the received electronic-cash-transaction-record information, further comprises: sending, by the microcontroller unit, an obtaining-transaction-record-format instruction to the smart card chip, receiving transaction-record-format information returned from the smart card chip, and parsing the transaction-record-format information to obtain the transaction record format; and said parsing the received electronic-cash-transaction-record information specifically comprises that parsing the received electronic-cash-transaction-record information according to the transaction record format.

8. The method as claimed in claim 1, wherein the second information is the number of retries of offline pin code; and Step S4 specifically comprises:

Step 4-1, sending, by the microcontroller unit, the selecting applet instruction to the smart card chip, and receiving the response to the selecting applet instruction returned from the smart card chip;

Step 4-2, sending, by the microcontroller unit, a reading-number-of retries-of-offline-pin-code instruction to the smart card chip, and receiving number-of-retries-of-offline-pin-code information returned from the smart card chip; and Step 4-3, parsing, by the microcontroller unit, the number-of-retries-of-offline-pin-code information to obtain the number of retries of offline pin code, and displaying the number of retries of offline pin code via the display device.

9. The method as claimed in claim 1, wherein the second information is supplementary information; and Step S4 specifically comprise:

Step 6-1, sending, by the microcontroller unit, the selecting applet instruction to the smart card chip, and receiving the response to the selecting applet instruction returned from the smart card chip;

Step 6-2, obtaining, by the microcontroller unit, supplementary-information-record-file information according to the response to the selecting applet instruction, and organizing a reading-supplementary-information-record instruction according to the supplementary-information-record-file information;

Step 6-3, sending, by the microcontroller unit, the reading-supplementary-information-record instruction to the smart card chip, and receiving supplementary information record returned from the smart card chip; and Step 6-4, parsing, by the microcontroller unit, the supplementary information record to obtain the supplementary information, and displaying the supplementary information obtained by parsing via the display device.

10. The method as claimed in claim 9, wherein the supplementary information comprises: coupon information and/or discount coupon information and/or customer manager information.

11. A visual smart card, wherein said card comprises an input device, a display device, a microcontroller unit, a smart card chip and a self-powered device, the microcontroller unit specifically comprises:

a receiving module, which is configured to receive an inquiring request input by a user via the input device;

a determining module, which is configured to determine information which the user requests to inquire according to the inquiring request received by the receiving module;

a storing module, which is configured to store a first information record;

a first reading-parsing module, which is configured to read the first information record stored in the storing module in the case that the determining module determines that the information which the user requests to inquire is the first information, and to parse the first information record to obtain the first information;

a second reading-parsing module, which is configured to send a selecting applet instruction to the smart card chip in the case that the determining module determines that the information which the user requests to inquire is a second information, and receive the response to the selecting applet instruction returned by the smart card chip, and send a reading-information-record instruction to the smart card chip, and receive a second information record returned from the smart card chip, and parse the second information record to obtain the second information; and a displaying module, which is configured to display the first information obtained by the first reading-parsing module and the second information obtained by the second reading-parsing module via the display device, the storing module is specifically configured to store transaction logs;

the first reading-parsing module is specifically configured to read the transaction logs stored in the storing module in the case that the determining module determines the information which the user requests to inquire is the first information, obtain the latest piece of record information from the transaction logs, and parse the obtained record information to obtain the previous transaction record; and the displaying module is specifically configured to display the previous transaction record obtained by the first reading-parsing module via the displaying module.

12. The visual smart card as claimed in claim 11, wherein the receiving module is further configured to receive a page-turning request from the user via the input device in the case that the displaying module displays the first information;

the storing module is specifically configured to store transaction logs; and the first reading-parsing module specifically comprises:

a reading unit, which is configured to read the transaction logs stored in the storing module in the case that the determining module determines that the information which the user requests to inquire is the first information;

a first obtaining unit, which is configured to obtain the latest piece of record information from the transaction logs read by the reading unit, and make the obtained record information as the current record information;

a second obtaining unit, which is configured to obtain the previous piece of record information of the current record information from the transaction logs read by the reading unit in the case that the receiving module receives a page-up request;

a third obtaining unit, which is configured to obtain a next piece of record information of the current record information from the transaction logs read by the reading unit in the case that the receiving module receives a page-down request;

a parsing unit, which is configured to parse the record information obtained respectively by the first obtaining unit, the second obtaining unit and the third obtaining unit to obtain transaction records; and the display module is specifically configured to display the transaction records obtained by the parsing unit via the display device, and further configured to display corresponding information in the case that the second obtaining unit and the third obtaining unit cannot obtain the record information.

13. The visual smart card as claimed in claim 11, wherein the microcontroller unit further comprises a selecting module, which is configured to select a target applet;

the storing module is specifically configured to store transaction logs;

the first reading-parsing module is specifically configured to read the transaction logs stored in the storing module in the case that the determining module determines that the information which the user requests to inquire is the first information, search from the transaction logs according to AID of the target applet selected by the selecting module and obtain the latest piece of record information of the target applet, parse the obtained record information to obtain the previous transaction record of the target applet; and the displaying module, which is specifically configured to display the previous transaction record of the target applet obtained by the first reading-parsing module via the display device.

14. The visual smart card as claimed in claim 11, wherein the microcontroller unit further comprises the selecting module, which is configured to select a target applet;

the receiving module is further configured to receive a page-turning request input by the user via the input device in the case that the displaying module displays the first information;

the storing module is specifically configured to store transaction logs;

the first reading-parsing module specifically comprises:

a reading unit, which is configured to read the transaction logs stored in the storing module in the case that the determining module determines the information which the user requests to inquire is the first information;

a first obtaining unit, which is configured to search from the transaction logs read by the reading unit according to AID of a target applet selected by a selecting module and obtain the latest piece of the record information of the target applet, and make the obtained record information as the current record information;

a second obtaining unit, which is configured to search from the transaction logs read by the reading unit when the receiving module receives a page-up request and obtain the previous piece of record information of the target applet;

a third obtaining unit, which is configured to search from the transaction logs read by the reading unit when the receiving module receives a page-down request and obtain the next piece of record information of the target applet; and a parsing unit, which is configured to parse the record information obtained respectively by the first obtaining unit, the second obtaining unit and the third obtaining unit to obtain the transaction records; and the displaying module, which is configured to display the transaction records obtained by the parsing unit via the displaying device, and further configured to display the corresponding information via the display device in the case that the second obtaining unit and the third obtaining unit cannot obtain the record information.

15. The visual smart card as claimed in claim 11, wherein the second reading-parsing module specifically comprises:

a selecting unit, which is configured to send the selecting applet instruction to the smart card chip, and receive the response to the selecting applet instruction returned from the smart card chip;

a reading unit, which is configured to send the reading-electronic-cash-balance instruction to the smart card chip, and receive electronic-cash-balance information returned from the smart card chip;

a parsing unit, which is configured to parse the electronic-cash-balance information received by the reading unit to obtain the electronic cash balance;

the displaying module, which is configured to display the electronic cash balance obtained by the parsing unit via the display device.

16. The visual smart card as claimed in claim 11, wherein the second reading-parsing module specifically comprises:
   a selecting unit, which is configured to send the selecting applet instruction to the smart card chip, and receive the response to the selecting applet instruction returned from the smart card chip;
   an organizing unit, which is configured to obtain transaction-record-file information according to the response to the selecting applet instruction received by the selecting unit, and organize a reading-electronic-cash-transaction-record instruction according to the transaction-record-file information;
   a reading unit, which is configured to send the reading-electronic-cash-transaction-record instruction organized by the organizing unit to the smart card chip, and receive the electronic-cash-transaction-record information returned from the smart card chip; and
   a parsing unit, which is configured to parse the electronic-cash-transaction-record information received by the reading unit to obtain the electronic cash transaction record; and
   the displaying module, which is configured to display the electronic cash transaction record obtained by the parsing unit via the display device.

17. The visual smart card as claimed in claim 16, wherein the microcontroller unit further comprises: a preparing for parsing unit, which is configured to send an obtaining-transaction-record-format instruction to the smart card chip, and receive transaction-record-format information returned from the smart card chip, and parse the transaction-record-format information to obtain the transaction record format; and
   the parsing unit is specifically configured to parse the electronic-cash-transaction-record information obtained by the reading unit according to the transaction record format obtained by the preparing for parsing unit.

18. The visual smart card as claimed in claim 11, wherein the second reading-parsing module specifically comprises:
   a selecting unit, which is configured to send the selecting applet instruction to the smart card chip, and receive the response to the selecting applet instruction returned from the smart card chip;
   a reading unit, which is configured to send a reading-the-number-of-retries-of-offline-pin-code instruction to the smart card chip, and receive the number-of-retries-of-offline-pin-code information returned from the smart card chip; and
   a parsing unit, which is configured to parse the number-of-retries-of-offline-pin-code information to obtain the number of retries of offline pin code; and
   the displaying module, which is specifically configured to display the number of retries of offline pin code obtained by the parsing unit via the displaying device.

19. The visual smart card as claimed in claim 11, wherein the second reading-parsing module specifically comprises:
   a selecting unit, which is configured to send the selecting applet instruction to the smart card chip, and receive the response to the selecting applet instruction returned from the smart card chip;
   a organizing unit, which is configured to obtain supplementary-information-record-file information according to the response to the selecting applet instruction received by the selecting unit, and organize the reading-supplementary-information-record instruction according to the supplementary-information-record-file information;
   the reading unit, which is configured to send the reading-supplementary-information-record instruction organized by the organizing unit to the smart card chip, and receive the supplementary information record returned from the smart card chip; and
   the parsing unit, which is configured to parse the supplementary information record received by the reading unit to obtain the supplementary information; and
   the displaying module is specifically configured to display the supplementary information obtained by the parsing unit via the display device.

20. The visual smart card as claimed in claim 19, wherein the parsing unit is specifically configured to parse to obtain the coupon information and/or discount coupon information and/or customer manager information; and
   the displaying module is specifically configured to display the coupon information and/or discount coupon information and/or customer manager information obtained by the parsing unit via the display device.

* * * * *